United States Patent
Kurumado

(10) Patent No.: US 7,173,413 B2
(45) Date of Patent: Feb. 6, 2007

(54) ROTATION DETECTION APPARATUS UTILIZING ARRAY OF MAGNETORESISTIVE ELEMENT BRIDGES AND METHOD OF DESIGNING THE APPARATUS

(75) Inventor: Norihiro Kurumado, Kasugai (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/103,645

(22) Filed: Apr. 12, 2005

(65) Prior Publication Data

US 2005/0225321 A1 Oct. 13, 2005

(30) Foreign Application Priority Data

Apr. 13, 2004 (JP) .............................. 2004-118126

(51) Int. Cl.
*G01B 7/30* (2006.01)
(52) U.S. Cl. .............................. 324/207.21; 324/207.25
(58) Field of Classification Search ........... 324/207.21, 324/207.25
See application file for complete search history.

(56) References Cited

U.S. PATENT DOCUMENTS 4,506,217 A 3/1985 Rothley et al.
5,869,962 A 2/1999 Kasumi et al.
6,924,639 B2 * 8/2005 Uenoyama .............. 324/207.25
2003/0173955 A1 9/2003 Uenoyama
2004/0174164 A1 * 9/2004 Ao .............................. 324/252

FOREIGN PATENT DOCUMENTS

JP   A-54-127346     10/1979
JP   2003-269995      9/2003

OTHER PUBLICATIONS

Search Report from French Patent Office Issued on May 23, 2006 for the corresponding French patent application No. FR 0503686.

* cited by examiner

*Primary Examiner*—Bot LeDynh
(74) *Attorney, Agent, or Firm*—Posz Law Group, PLC

(57) ABSTRACT

A rotation detection apparatus utilizes a bias magnet and an array of four or more sets of magnetoresistive elements, with each set producing an output potential varying according to changes of a magnetic field vector as protrusions and recessed portions of a rotor periphery move past the array, and utilizes differential amplifiers to operate on specific combinations of the output potentials for deriving a detection signal expressing rotation information. By appropriately adjusting respective positions of the sets of magnetoresistive elements and/or respective amplification factors of the differential amplifiers, suitable detection characteristics for various rotor configurations can be obtained.

8 Claims, 15 Drawing Sheets

ROTATION DETECTION APPARATUS UTILIZING ARRAY OF MAGNETORESISTIVE ELEMENT BRIDGES AND METHOD OF DESIGNING THE APPARATUS

CROSS-REFERENCE TO RELATED APPLICATIONS

This application is based on and incorporates herein by reference Japanese Patent Application No. 2004-118126 filed on Apr. 13, 2004.

BACKGROUND OF THE INVENTION

1. Field of Application

The present invention relates to a rotation detection apparatus which detects rotation information concerning a rotor that is formed of a magnetic material, and which utilizes magnetoresistive element (MREs) which change in resistance in response to changes in an applied magnetic field.

2. Description of Prior Art

Types of rotation detection apparatus which utilize MREs are known, for example for obtaining information concerning rotation of a toothed rotor that is provided on the crankshaft or camshaft of an internal combustion engine of a vehicle. Such a type of rotation detection apparatus includes a bias magnet, which produces a bias magnetic field that links with the rotor, and one or more MREs that change in resistance in accordance with changes in a vector of the bias magnetic field. These changes in the magnetic field are processed electrically, to thereby detect changes in the rotation position of the rotor which is the detection object. That is to say, the magnetic vector of the bias magnetic field that links with the detection object (rotor) has periodic angular variations in accordance with the passage of protrusion portions of the rotor periphery and recessed portions of that periphery through the bias magnetic field, as the rotor rotates. The resistances of the MREs vary in accordance with these variations in the magnetic vector of the bias magnetic field, and so vary in accordance with the passing of the protrusion portions and recessed portions of the rotor.

In general with such a rotation detection apparatus, a plurality of MREs are mounted in a sensor chip, and the angular variations of the magnetic vector will differ in accordance with the size of the air gap between the sensor chip and the rotor periphery. That is to say, for the same amount of angular rotation, of the same rotor, the amount of angular variation of the magnetic vector will differ in accordance with the air gap. On the other hand, for the same rotor, if the air gap is altered then it is found that there is a specific "air gap characteristic minimum point", which is a specific value of magnetic vector angle (corresponding to some specific size of air gap) for which the amounts of increase and decrease of magnetic vector angle with respect to that specific angle (as the rotor rotates) are of equal magnitude. The variations in the magnetic vector angle result in corresponding variations in an output detection signal indicative of changes in rotation angle of the rotor, and the value of output detection signal corresponding to the air gap characteristic minimum point is appropriate for use as a threshold value, for use in converting the output detection signal to a binary signal.

Hence it would be desirable to provide a rotation detection apparatus whereby the air gap characteristic minimum point is held constant, irrespective of changes in the shape of the rotor. If such a type of rotation detection apparatus were available, then operations such as setting of individual detection threshold values in accordance with different shapes of rotor would be substantially reduced.

In that regard, as described for example in Japanese patent publication No. 2003-269995, a type of rotation detection apparatus is known whereby the aforementioned air gap characteristic minimum point is held constant irrespective of rotor shape. With that prior art rotation detection apparatus, a sensor chip is used having an array of four sets of four MREs. Each set of four MREs are connected in series between a power supply voltage and a reference (ground) potential, with a median voltage-divided output being extracted (i.e., whose value would be ½ of the power supply potential, if all four MREs have identical resistance values). Such a median voltage-divided output will be referred to in the following as the median output potential of such a set of MREs. Variations in the median output potential can be used to derive rotation information concerning a rotor.

FIG. 21 shows the configuration of that prior art rotation detection apparatus. As shown, the apparatus includes a sensor chip 104 having a row of four sets of four MREs, the sets respectively designated as A, B, C, D. Each set of four MREs is arranged, as shown, in a square configuration, interconnected such that current first flows successively through a first diagonally opposed pair of MREs, then successively through the second diagonally opposed pair of MREs, with a median output potential being produced with respect to the reference (ground) potential. In the following description and in the appended claims, such a set of four MREs, configured physically and electrically substantially as for each of the sets A, B C, D shown in FIG. 21, will be referred to as a "MRE bridge", although the electrical configuration is that of a magnetoresistive voltage divider, Respective median output potentials V1, V2, V3, V4 from these MRE bridges A, B, C, D are inputted to a differential circuit, which performs processing to derive from these a single differential output signal Vd, where Vd=2×(V3−V4)−(V1−V2). By using this differential output signal Vd, the air gap characteristic minimum point can be held constant, irrespective of changes in rotor shape. In the following, "differential output signal" will be abbreviated to "differential output", for brevity of description.

FIGS. 22, 23 show the output waveforms of the differential output Vd, for different shapes of rotor. It should be understood that the term "changes in rotor shape" as used herein is intended to signify changes in the respective lengths (as measured around the rotor circumference) of protrusion portions and recessed portions of the rotor periphery, i.e., changes in the respective angular extents (as measured with respect to the rotor axis as center) of the protrusion portions and recessed portions. Similarly, the terms "narrow/wide" as applied herein to protrusion portions or to recessed portions respectively signify "relatively short/relatively long in peripheral extent", i.e., "relatively small/relatively large in angular extent".

FIG. 22 shows examples of waveforms of the differential output Vd (shown expressed in the form of angular variations of the magnetic vector of the bias magnetic field, as described above) for the case in which both the protrusion portions and the recessed portions of the rotor that is the detection object are relatively narrow. The differential output Vd changes in accordance with the angular variation of the vector of the bias magnetic field, and Vd is expressed in FIG. 22 in terms of the angular variation of that vector. As can be understood from FIG. 22, the air gap characteristic minimum point. (expressed as a value of magnetic vector angle) is approximately 10° with this example.

FIG. 22 shows examples of waveforms of the differential output Vd (again expressed as variations in the magnetic field vector angle) for the case in which both the protrusion portions and the recessed portions of the rotor that is the detection object are relatively wide. Here again, it is found that the air gap characteristic minimum point is approximately 10°.

Thus, by using a set of four MRE bridges in that way, obtaining the differential output Vd from the four output voltages of these MRE bridges, as Vd=2×(V3−V4)−(V1−V2), the air gap characteristic minimum point remains substantially constant, irrespective of changes in the shape of the rotor. Hence, if the value of the air gap characteristic minimum point is used as a threshold value for converting the differential output Vd to a binary signal, rotation information concerning the rotor can be easily and accurately detected.

However as is clear from FIGS. 22, 23, as the shape of the rotor is changed, the waveform of the differential output Vd also changes accordingly. For example with the rotor shape of FIG. 22, the waveform of the differential output Vd changes in a sinusoidal manner in accordance with the passing of the protrusion portions and recessed portions of the rotor periphery. However with the rotor shape of FIG. 23, the waveform of the differential output Vd exhibits abrupt changes between high and low values, due to the phenomenon of magnetic distortion.

FIG. 24 shows examples of waveforms of the differential output Vd (again expressed as variations in the magnetic field vector), for different rotor shapes and different sizes of the air gap. These show the following:

(a) In the case of the rotor shape designated as Sa (having relatively narrow protrusion portions and recessed portions), it can be understood that the maximum and minimum regions of the differential output Vd characteristic respectively correspond to the protrusion portions and recessed portions of the rotor.

(b) In the case of the rotor shape designated as Sb (having relatively narrow protrusion portions and relatively wide recessed portions), it can be understood that the regions of the differential output Vd that correspond to the protrusion portions of the rotor show a relatively sinusoidal variation. However the regions of the differential output Vd that correspond to the recessed portions of the rotor are greatly attenuated at positions corresponding to the centers of these recessed portions.

(c) In the case of the rotor shape designated as Sc (in which both the protrusion portions and the recessed portions are relatively wide) it can be understood that the waveform of the differential output Vd falls abruptly at the respective center positions of the protrusion portions and the recessed portions of the rotor.

For convenience of description, the rotor shapes Sa, Sb, Sc illustrated in FIG. 24 will be referred to in the following as the narrow-protrusion rotor, the equal-pitch rotor and the wide-protrusion rotor, respectively.

Since the waveform of the differential output Vd varies as described above in accordance with the shape of the rotor, this results in slight variations in the degree of latitude (as defined hereinafter) and angular accuracy of detecting rotation information for a rotor based on the differential output Vd, The concepts of "degree of latitude" and "angular accuracy" as used herein will be described referring to FIGS. 25 and 26.

FIG. 25 illustrates the relationship between the waveform of the differential output Vd and various types of air gap, for describing the concept of "degree of latitude". As shown in FIG. 25, as the air gap becomes larger, the amplitude of the differential output Vd becomes smaller, and reaches a minimum value at positions corresponding to the centers of the protrusion portions and the recessed portions of the rotor.

Considering:

(a) the difference between the minimum value of the differential output Vd that corresponds to a protrusion portion of the rotor (i.e., that is produced while a protrusion portion of the rotor periphery is moving past the MREs) and the air gap characteristic minimum point, and (b) the difference between the minimum value of differential output Vd that corresponds to a recessed portion of the rotor and the air gap characteristic minimum point;

the smaller of these two values of difference with respect to the air gap characteristic minimum point constituting the "degree of latitude".

When the degree of latitude falls below a predetermined level, then errors will occur in the detection pulses that are derived by the rotation detection apparatus, so that errors will arise in the rotation information that is derived by the apparatus.

FIG. 26 is a diagram for describing the concept of "angular accuracy" as used herein in describing a rotation detection apparatus. Specifically, FIG. 26 shows a magnified portion of the differential output Vd waveform (i.e., as represented by the angular variation of the bias magnetic field vector) of FIG. 25 (designated as the region S, in FIG. 25). In FIG. 26, the bias magnetic field vector angle corresponding to both the point of intersection PI between the waveforms of the differential output Vd for the case of a "small" air gap and the point of intersection P2 for the case of a "medium" air gap is the air gap characteristic minimum point. There is an angular difference $\Delta\alpha$ ($=\alpha1-\alpha2$) between the rotor rotation angles $\alpha1$ and $\alpha2$ that respectively correspond to the intersection points P1 and P2, and this angular difference $\Delta\alpha$ constitutes the "angular accuracy", as used herein in describing a rotation detection apparatus.

Alternatively stated, the angular accuracy is the degree of accuracy with which rotor rotation angles are attained that respectively correspond to coincidence between the amplitude of the differential output Vd (as the rotor rotates) and the value of Vd corresponding to the air gap characteristic minimum point.

Since the waveform of the differential output Vd varies in accordance with rotor shape, the degree of latitude and angular accuracy in detecting the rotation information also change accordingly. Thus for example when a rotation detection apparatus is used for detecting rotation of the crankshaft or camshaft of the internal combustion engine of a vehicle, the requirements for the degree of latitude and for the angular accuracy will differ, depending upon whether rotation of the crankshaft or rotation of the camshaft is to be detected.

Specifically, in the case of detection of rotation of a camshaft, a rotor (coupled to the camshaft) that is used in conjunction with a rotation detection apparatus will generally be formed with relatively wide peripheral protrusions, for the purpose of accurately discriminating between the respective cylinders of the internal combustion engine. Thus in such an application, a large degree of latitude is more important than a high angular accuracy.

In the case of detection of rotation of a crankshaft on the other hand, a rotor (coupled to the crankshaft) that is used in conjunction with a rotation detection apparatus will generally be formed with relatively narrow peripheral protrusions, for the purpose of accurately detecting the rotation angle of the crankshaft. Thus in such an application, a high angular accuracy is more important than a large degree of latitude.

With a prior art type of rotation detection apparatus, it has not been possible to readily design the apparatus to have optimum rotation detection characteristics for use in such different forms of application.

SUMMARY OF THE INVENTION

It is an objective of the present invention to overcome the above problem by providing a rotation detection apparatus, and a method of designing such an apparatus, which enable optimization of the rotation detection characteristics of the apparatus in accordance with the shape of a rotor that is the detection object of the rotation detection apparatus. The invention provides a rotation detection apparatus which can be utilized for detecting a rotation condition of a rotor that is formed of a magnetic material and has a circumferential periphery having successively alternating protruding portions and recessed portions, with the apparatus including a sensor chip having a plurality of MREs and a bias magnet for applying a bias magnetic field to the MREs, and with detection being performed by sensing changes in resistance values of the MREs due to changes in a magnetic vector of the bias magnetic field as the circumferential periphery of the rotor rotates close to the sensor chip.

To achieve the above objectives, according to a first aspect, the apparatus is configured with the MREs of the sensor chip arranged and connected as an array of at least four MRE bridges (where the term "MRE bridge" as used in the description of the present invention and the appended claims has the specific significance that has been defined hereinabove referring to FIG. 21) having an orientation determined by the rotation direction of the rotor. Designating a "first distance" as the distance between an end face of the bias magnet that is located directly opposite the circumferential periphery of the rotor (i.e., with that end face being used as a position reference) and each of respective centers of at least two MRE bridges which are located at inward positions within the array of MRE bridges (in relation to the central magnetic axis of the bias magnet), and designating a "second distance" as the distance between the reference end face of the bias magnet and each of respective centers of at least two MRE bridges which are located at outward positions within the array of MRE bridges, values for the first distance and second distance are respectively separately set.

With such a rotation detection apparatus, when the direction of the magnetic vector is altered, changes occur in the median output potentials of the outer pair of MRE bridges that are different from resultant changes which occur in the median output potentials of the inner pair of MRE bridges. However in addition, the assignee of the present invention has found that, by adjusting the aforementioned first distance and second distance respectively separately, it is possible to thereby effect changes in the median output potentials of the outer pair of MRE bridges that are different from resultant changes which occur in the median output potentials of the inner pair of MRE bridges. It has thereby been found possible to alter the aforementioned degree of latitude and angular accuracy, by suitable performing such position adjustments. It thereby becomes possible to realize a rotation detection apparatus whose rotation detection characteristics can be optimized for use with each of various different configurations of rotor, e.g., the aforementioned narrow-protrusion rotor configuration, or equal-pitch rotor configuration, or wide-protrusion rotor configuration.

Such a rotation detection apparatus preferably comprises differential circuit means for generating a signal referred to herein as the "main component" signal, based on the difference between respective median output potentials of the at least two MRE bridges which are located at inward positions in relation to a central magnetic axis of the bias magnet, a signal referred to herein as the "compensation component" signal, based on the difference between respective median output potentials of the at least two MRE bridges which are located at outward positions in relation to the central magnetic axis, and a single differential output signal (constituting an output detection signal which conveys rotation information concerning the rotor) based on a difference between the main component signal and the compensation component signal, with the aforementioned first distance and second distance being respectively separately set such that the waveform of the single differential output signal attains a condition predetermined in accordance with the configuration of the rotor periphery. This further enables the rotation detection characteristics to be optimized for use with each of various different configurations of rotor, As described above, the single differential output signal will in general converted to a binary signal before being utilized, with the conversion executed using a specific threshold value. The aforementioned condition that is predetermined for the waveform of the single differential output signal in accordance with the rotor configuration can be that the degree of latitude (as defined hereinabove) will attain a predetermined standard. In that which case, respective values for the aforementioned first distance and second distance are established such as to have the relationship:

first distance<second distance.

Alternatively, the condition that is predetermined for the waveform of the single differential output signal can be that the angular accuracy (as defined hereinabove) of the apparatus will be substantially high. In that case, the aforementioned first distance and second distance are respectively set such as to have the relationship:

first distance>second distance.

The rotation detection apparatus can thereby be optimized for use with a narrow-protrusion rotor or an equal-pitch rotor, i.e., so that a high degree of accuracy of edge detection is required. Achieving a sufficiently high degree of angular accuracy (as defined hereinabove) ensures that such high accuracy of edge detection can be achieved.

As a further alternative, it may be necessary to ensure that both the degree of latitude and the angular accuracy each attain predetermined standards, i.e., each is sufficiently high. In that case, again, the first distance and second distance are respectively set such as to have the relationship:

first distance>second distance.

According to a further aspect, with the rotation detection apparatus having first, second and third differential amplifiers for respectively deriving the aforementioned compensation component signal, main component signal, and single differential output signal, respective predetermined appropriate amplification factors are set for the first differential circuit, second differential circuit and third differential circuit.

This enables the rotation detection characteristics of the rotation detection apparatus to be optimized for a particular type of rotor configuration, by means of an electrical form of adjustment (i.e., of amplifier gain values), rather than by physically altering the positions of MRE bridges. This type of electrical adjustment also enables suitable values to be established for the degree of latitude and the angular accuracy (as defined hereinabove), for various different forms of rotor configuration.

Specifically, the respective amplification factors of the first differential circuit, second differential circuit and third differential circuit can be separately set such that the waveform of the single differential output signal attains a condition predetermined in accordance with the configuration of the rotor periphery.

In particular, when the condition that is predetermined for the waveform of the single differential output signal is that the degree of latitude attain a predetermined standard, then designating the respective amplification factors of the first differential circuit and second differential circuit as K1 and K2, and designating respective amplitude values of the main component signal and the compensation component signal as A1 and A2, values for K1, K2 are respectively set such that the following relationship is satisfied:

(K1×A1−K2×A2)>(2×A1−A2).

The waveform of the single differential output signal can thereby be increased in amplitude, by reducing the amplitude of the compensation component, thereby enabling a higher degree of latitude to be achieved.

As a further alternative, the condition that is predetermined for the waveform of the single differential output signal is that the angular accuracy (as defined hereinabove) attain a predetermined standard. In that case this can be achieved by setting values for K1, K2 respectively such that the following relationship is satisfied:

K1/K2<2.

As yet a further alternative, it may be that the condition that is predetermined for the waveform of the single differential output signal is that both a large degree of latitude and high angular accuracy are to be achieved. In that case again, values for K1, K2 are respectively set such that the above relationship is satisfied, i.e.:

K1/K2<2.

DESCRIPTION OF PREFERRED EMBODIMENTS

First Embodiment

A first embodiment will be described referring to FIGS. 1 to 6. This is a rotation detection apparatus which can be optimized for use with a specific detection object, for example a rotor coupled to the camshaft of an internal combustion engine, with the rotor being formed with relatively wide protrusion portions (as defined hereinabove), for enabling discrimination of respective cylinders of the engine.

Figure 1:
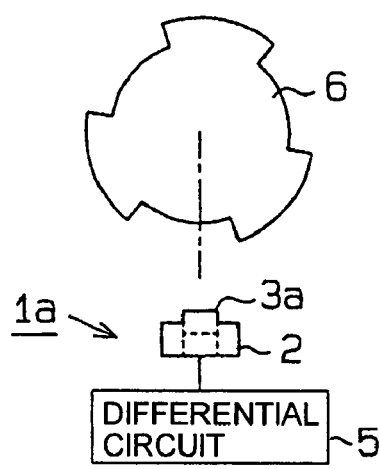
FIG. 1 is a diagram showing the general configuration of a first embodiment of a rotation detection apparatus, and a rotor which is the detection object of the apparatus.

FIG. 1 conceptually illustrates an embodiment of a rotation detection apparatus 1a, and a rotor 6 which is the detection object of this embodiment, as viewed along the direction of the axis of the rotor 6. As shown, the rotation detection apparatus 1a includes a bias magnet 2, for producing a bias magnetic field, which is disposed opposite the circumferential periphery of the wide-protrusion rotor 6. The wide-protrusion rotor 6 is a wide-protrusion rotor, formed of a magnetic material. A sensor chip 3a, formed of an array of MRE bridges, is mounted in a face of the bias magnet 2 located opposite the circumferential periphery of the wide-protrusion rotor 6, as shown (with the sensor chip 3a shown as protruding from that face, in the conceptual diagram of FIG. 1, for ease of understanding). Specifically, a cavity is formed in that face of the bias magnet 2, and the sensor chip 3a is fixedly attached within that cavity.

The body of the sensor chip 3a can for example be formed by molding, using a thermally hardened type of synthetic resin such as epoxy resin.

The bias magnet 2 is disposed with its central magnetic axis (which coincides with the central axis of the sensor chip 3a) oriented such as to pass through the rotation axis of the wide-protrusion rotor 6. In that way, the bias magnetic field that is produced by the bias magnet 2 has a magnetic vector that exhibits a periodic angular variation in accordance with rotation of the wide-protrusion rotor 6. The angular variation of the magnetic vector is sensed by the MRE bridges of the sensor chip 3a, whose respective resistance values vary accordingly. These variations in resistance value of the MRE bridges result in changes in the respective median output potentials of the MRE bridges, and the rotation detection apparatus 1a includes a differential circuit 5 which performs differential processing of these changes in the median output potentials of the MRE bridges. The array of MRE bridges A to D is oriented in accordance with the rotation axis of the rotor 6, i.e., with respective centers of the MRE bridges being located substantially within a plane that is at right angles to the rotation axis of the rotor 6.

Figure 2:
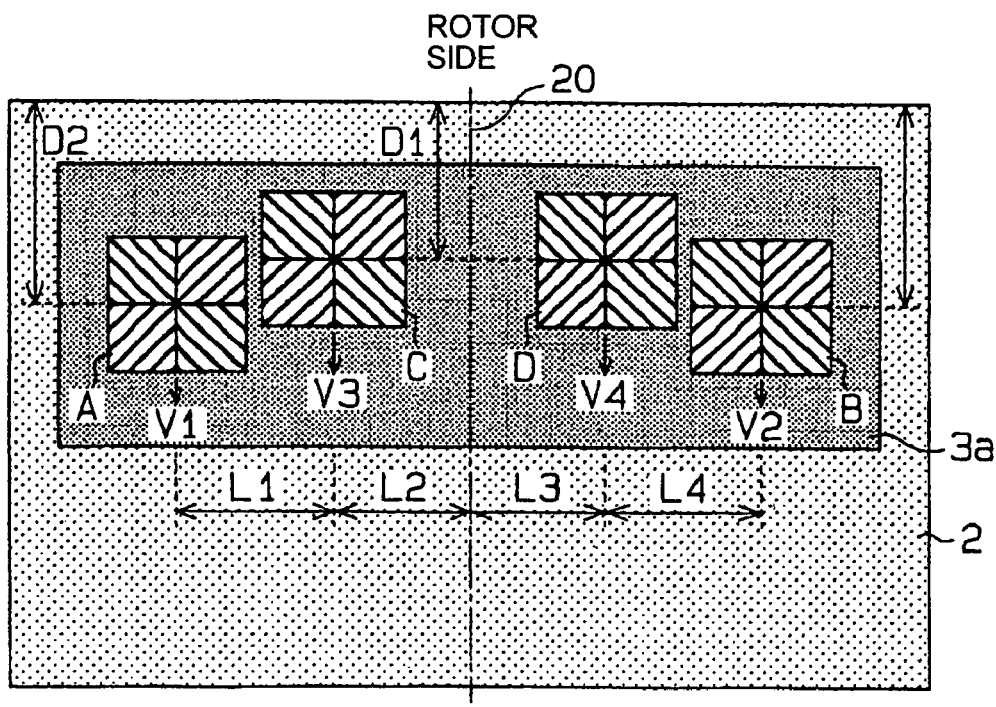
FIG. 2 is a plan view conceptually illustrating the configuration of a sensor chip of the first embodiment.
Figure 3:
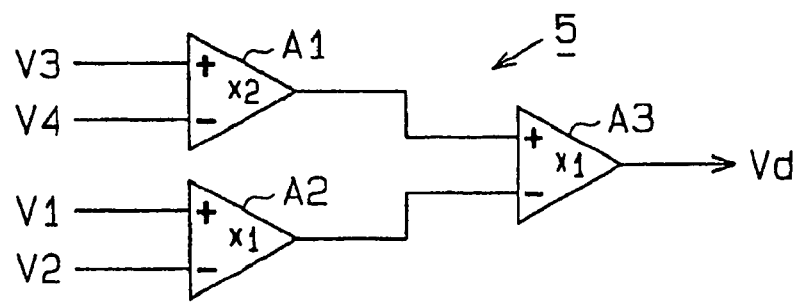
FIG. 3 is a circuit diagram of a differential amplifier circuit of the first embodiment.

FIG. 2 is a plan view showing the general configuration of the sensor chip 3a, and in particular showing a sensor section of the sensor chip 3a. As shown in FIG. 2, the sensor chip 3a includes an array of four MRE bridges, respectively designated as A, B, C and D. The two outer MRE bridges A and B are located symmetrically on opposing sides of the aforementioned central magnetic axis of the bias magnet 2, designated by numeral 20. The two inner MRE bridges C and D are also located symmetrically on opposing sides of central magnetic axis 20, with the MRE bridge C being located midway between the center of the MRE bridge A and the central magnetic axis 20, and the MRE bridge D being located midway between the center of the MRE bridge B and the central magnetic axis 20.

In addition, as also shown in FIG. 2, the distance L1 between the centers of the MRE bridges A and C, the distance L4 between the centers of the MRE bridges D and B, the distance L2 between the center of the MRE bridge C and the central magnetic axis 20, and the distance L2 between the center of the MRE bridge D and the central magnetic axis 20 (with each of the distances L1, L2, L3, L4 measured along a direction at right angles to the central magnetic axis 20) are respectively identical. Hence, the array of MREs A to D has a predetermined orientation with respect to the rotation axis of the rotor 6.

With this embodiment, the outer pair of MRE bridges A and B are disposed farther from the face of the bias magnet 2 that opposes the wide-protrusion rotor 6 (with that face of the bias magnet 2 being referred to as the "rotor-side face" in the following) than the inner pair of MRE bridges C and D. Specifically, the distance D2 between the respective centers of the MRE bridges A and B and the rotor-side face of the bias magnet 2 is made longer than the distance D1 between the respective centers of the MRE bridges C and D and that rotor-side face (D2>D1).

Variations in the angle of the magnetic vector of the bias magnet 2 are detected as changes in resistance of the MREs of the MRE bridges A, B, C, D, which are extracted as corresponding changes in their respective median output potentials. These four median output potentials (i.e., the outputs shown as V1, V2, V3, V4 from the MRE bridges A, B, C and D respectively as indicated in FIG. 2) are inputted to the differential circuit 5 as shown in the circuit diagram of FIG. 3.

The differential circuit 5 is formed of three differential amplifiers, A1, A2 and A3. The differential amplifier A1 has a amplification factor of 2, so that the median output potentials V3, V4 from the MRE bridges C and D result in a differential output of [2×(V3−V4)] being produced from the differential amplifier Al. The differential amplifiers A2, A3 each have an amplification factor of 1, so that the median output potentials V1, V2 from the MRE bridges A and B result in a differential output of (V1−V2) being produced from the differential amplifier A2. These differential outputs from the differential amplifiers A1, A2 are inputted to the differential amplifier A3, which thereby produces a single differential output Vd, where the amplitude of Vd is obtained as [2×(V3−V4)−(V1−V2)].

With this embodiment, rotation information concerning the wide-protrusion rotor 6 is obtained based on this single differential output Vd.

In that way, the differential circuit 5 produces an output signal having two components, i.e.,:

{2×(V3−V4)}, designated in the following as the main component, which is derived from the median output potentials of the MRE bridges C and D, and (V1−V2), designated in the following as the compensation component, which is derived from the median output potentials of the MRE bridges A and B.

Thus, by altering the amplitude of the waveform of the compensation component in relation to that of the main component, it becomes possible to alter the differential output Vd to have a desired amplitude or shape of waveform.

It should be noted that with this embodiment, by locating two outer MRE bridges A and B (from which the compensation component of Vd is derived) at positions which are farther from the rotor-side face of the bias magnet 2 than the two inner MRE bridges C and D, the amplitude of the compensation component of Vd is accordingly reduced, i.e., the amplitude of the single differential output Vd is accordingly increased. In that way, the wide-protrusion rotor 6 can reliably have a high degree of latitude (as defined hereinafter) in rotation information detection, when the detection object of the rotation detection apparatus 1*a* is the wide-protrusion rotor 6.

Figure 4:
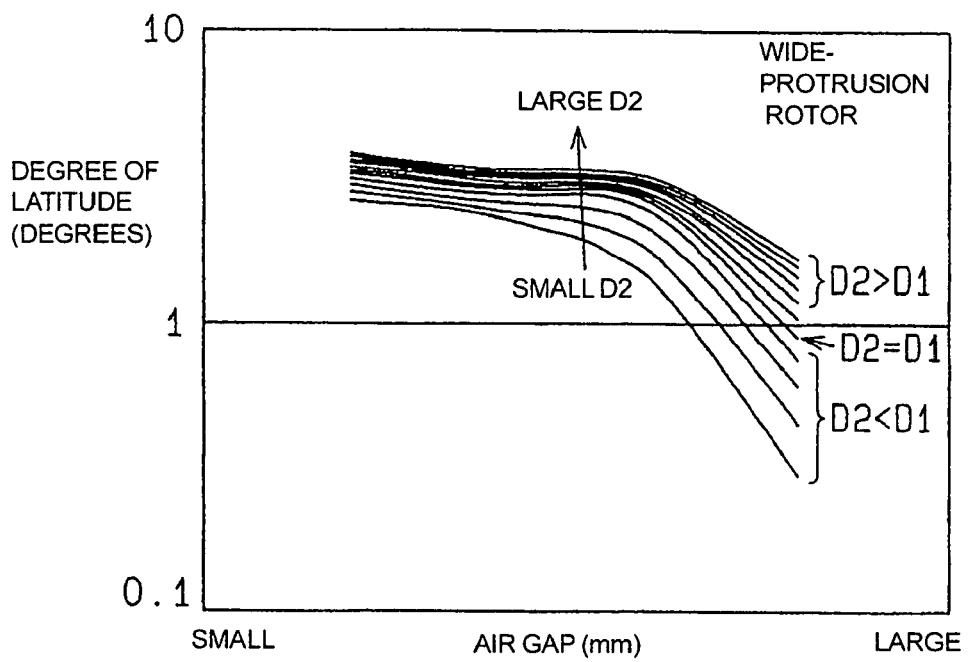
FIG. 4 shows graphs illustrating relationships between positions of MRE bridges and a degree of latitude, for the first embodiment.

The relationship between the respective locations of the MRE bridges A and B and the aforementioned degree of latitude will be described referring to the graphs of FIG. 4. In FIG. 4, results of electromagnetic simulation are shown for the cases in which the MRE bridges A to D have the following respective predetermined positions:

(a) The MRE bridges A, B are located at respective positions each of which is farther from the rotor-side face of the bias magnet 2 than the positions of the MRE bridges C and D (i.e., D2>D1).

(b) The MRE bridges A to D are arrayed in a single row (i.e., D2=D1).

(c) The MRE bridges A, B are located at respective positions each of which is closer to the rotor-side face of the bias magnet 2 than the positions of the MRE bridges C and D (i.e., D2<D1).

As is clear from FIG. 4, for the same size of air gap, the highest degree of latitude is obtained for case (a) above, (D2>D1), with the MRE bridges A and B positioned farther from the rotor-side face of the bias magnet 2 than the MRE bridges C and D. With case (c) above (D2<D1), whereby the MRE bridges A, B are located at positions closer to the rotor-side face of the bias magnet 2 than the positions of the MRE bridges C and D, the degree of latitude is substantially lowered, by comparison with case (a). Overall, the greater the distance D2 of the MRE bridges A and B from the rotor-side face of the bias magnet 2, the higher becomes the degree of latitude. Furthermore, as the size of the air gap is increased, the degree of latitude decreases accordingly.

As is clear from the simulation results shown in FIG. 4, if the MRE bridges A, B are set at positions closer to the rotor-side face of the bias magnet 2 then the MRE bridges C, D, and the air gap is made large, then the degree of latitude will fall below a standard value (i.e., degree of latitude=1). This standard value corresponds to a value of the differential output Vd that is necessary to ensure that error pulses will not be produced when the differential output Vd is converted to a binary signal.

In that way, the positions at which the MRE bridges are located will have a large effect on the degree of latitude of detection of rotation information by the rotation detection apparatus 1*a*. In the case of the wide-protrusion rotor 6 being the detection object, if the MRE bridges A, B are positioned farther from the rotor-side face of the bias magnet 2 than the MRE bridges C, D, then the degree of latitude is increased.

On the other hand, the positions at which the MRE bridges A, B are located have an effect on the angular accuracy of rotation information detection. This effect is illustrated in the magnetic simulation results shown in the graphs of FIG. 5, which show results obtained for the case of a narrow-protrusion rotor and the case of a equal-pitch rotor being respective detection objects, as well as for the case of the wide-protrusion rotor 6.

Figure 5:
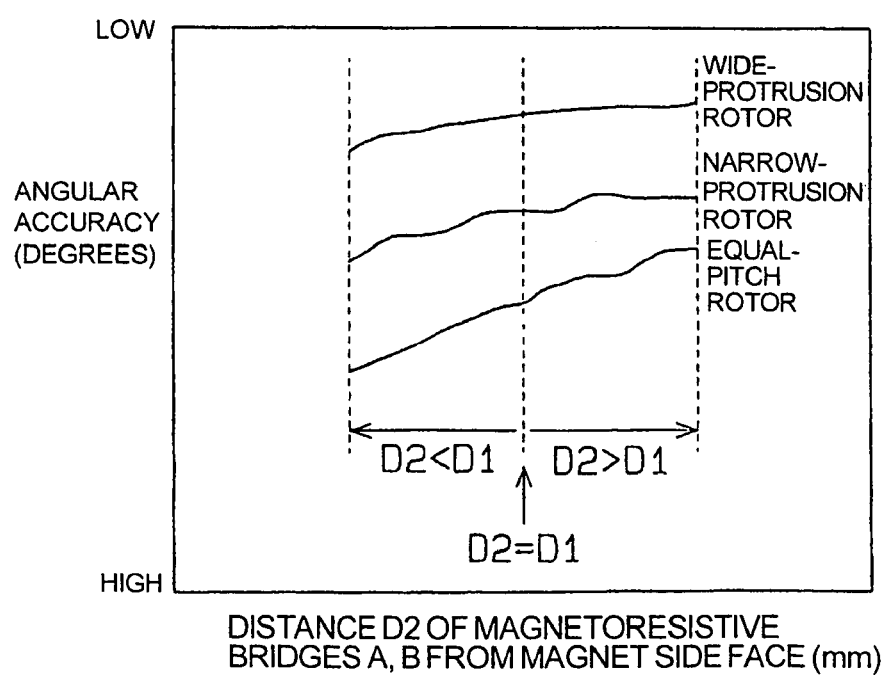
FIG. 5 shows graphs illustrating relationships between changes in rotor configuration and angular accuracy, for the first embodiment.

It can be understood from FIG. 5 that irrespective of the rotor shape, when the MRE bridges A and B are located closer to the rotor-side face of the bias magnet 2 than the MRE bridges C and D (i.e., D2<D1), the angular accuracy is increased. Furthermore, the smaller the distance D2 between the MRE bridges A, B and the rotor-side face of the bias magnet 2, the higher becomes the angular accuracy. Furthermore, for the same value of distance D2, the highest degree of angular accuracy is obtained when the narrow-protrusion rotor is the detection object. Specifically, the angular accuracy successively decreases in the order: narrow-protrusion rotor→equal-pitch rotor→wide-protrusion rotor.

However as described above, in the case of the wide-protrusion rotor 6 being used in conjunction with the camshaft of an internal combustion engine for discriminating the engine cylinders, a high degree of latitude is more important than a high level of angular accuracy. This is due to the fact that in such an application, after engine starting has been completed, it is only necessary to detect rotation angle information once, for discriminating the engine cylinders. Also, from mechanical considerations, it is preferable to make the degree of degree of tolerance for the air gap size as large as possible. For that reason, with this embodiment, a high degree of latitude is achieved, which is done to some extent at the expense of angular accuracy.

Figure 6A:
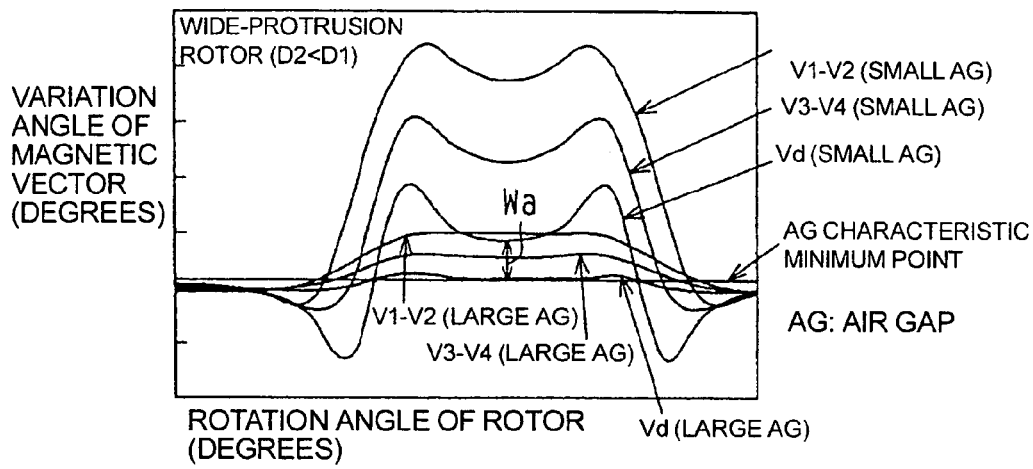
FIGS. 6A to 6C show graphs illustrating the relationship between positions of MRE bridges and waveforms corresponding to those of a differential output Vd, a compensation component of the differential output Vd, and a main component of the differential output Vd, for the case of a wide-protrusion rotor being the detection object of the rotation detection apparatus.
Figure 6B:
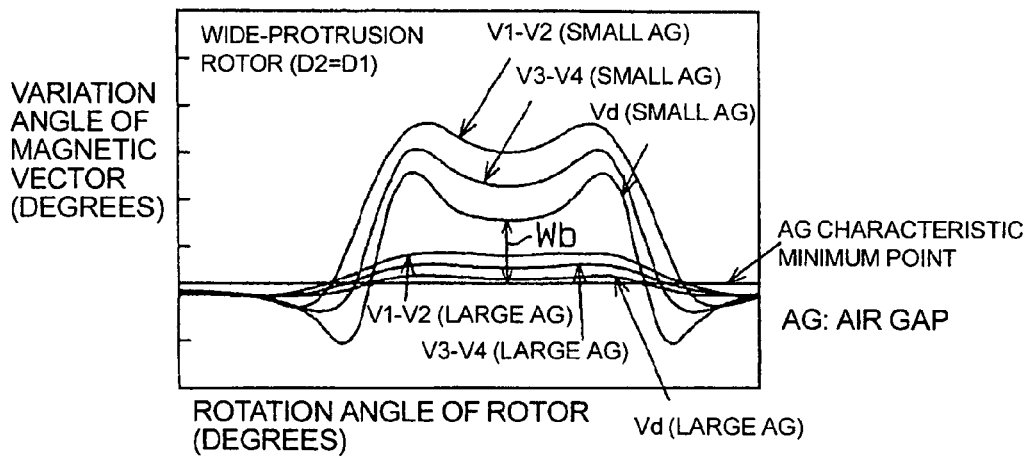
Figure 6C:
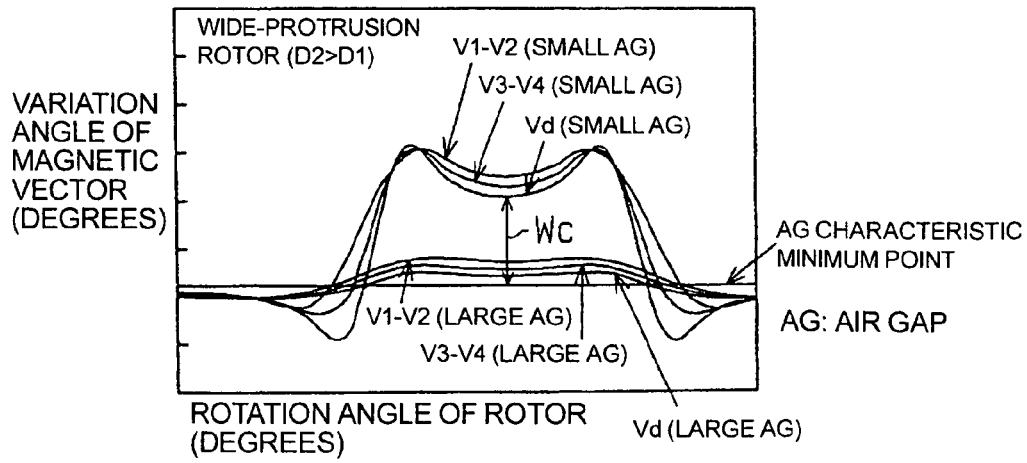

FIG. 6A to 6C are diagram showing relationships between the main component and the compensation component which constitute the differential output Vd, and the locations of the MRE bridges A and B, for the case of the wide-protrusion rotor 6 being the detection object. FIG. 6A shows waveforms of the differential output Vd, and its main component and compensation component, for the case in which the MRE bridges A, B are closer to the rotor-side face of the bias magnet 2 than the MRE bridges C and D (i.e., D2<D1). FIG. 6B shows waveforms of the differential output Vd, and its main component and compensation component, for the case in which the MRE bridges A, B, C and D are aligned in a row (i.e., D2=D1). FIG. 6C shows waveforms of the differential output Vd, and its main component and compensation component, for the case in which the MRE bridges A, B are located farther from the rotor-side face of the bias magnet 2 than the MRE bridges C and D (i.e., D2>D1).

As is clear from FIGS. 6A to 6C, as the distance of the MRE bridges A, B from the rotor-side face of the bias magnet 2 is increased, the amplitude of the output waveform of the compensation component (V1–V2) is decreased. As a result, the amplitude of the differential output Vd is increased. In that way, designating the degree of latitude for FIG. 6A as Wa, the degree of latitude for FIG. 6B as Wb, and the degree of latitude for FIG. 6C as Wc, the relationship between these is:

Wa<Wb<Wc.

As described above, with this embodiment of a rotation detection apparatus, the following effects are obtained. With the configuration example of FIG. 2, the MRE bridges A, B are set farther from the rotor-side face of the bias magnet 2 than are the MRE bridges C and D. As a result, the amplitude of the compensation component (V1–V2) is decreased, so that the amplitude of the differential output Vd is increased, and so the degree of latitude for detecting rotation information can be appropriately increased, when the wide-protrusion rotor 6 is the detection object.

Second Embodiment

A second embodiment of a rotation detection apparatus utilizing magnetic detection will be described in the following referring to FIGS. 7 to 12. This embodiment can be advantageously applied when the detection object is a narrow-protrusion rotor which is utilized, for example, for detection of the rotation angle of a crankshaft of an internal combustion engine.

With this embodiment, the MRE bridges A and B are disposed closer to the rotor-side face of the bias magnet 2 than the MRE bridges C and D. In other respects, this embodiment is similar to the first embodiment, with components corresponding to those of the first embodiment being designated by corresponding reference numerals to those of the first embodiment, so that detailed description is omitted.

Figure 7:
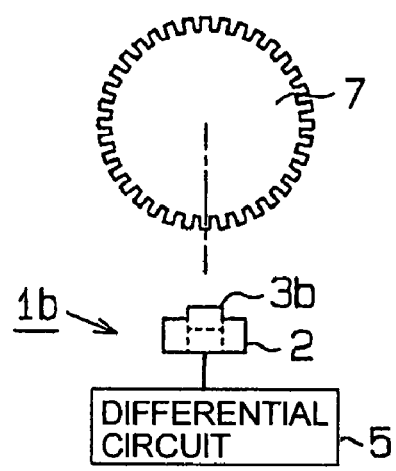
FIG. 7 is a diagram showing the general configuration of a second embodiment of a rotation detection apparatus, and a rotor which is the detection object of the apparatus.

FIG. 7 conceptually illustrates the overall configuration of this embodiment of a rotation detection apparatus 1b, and a narrow-protrusion rotor 7 which is the detection object. As shown, the rotation detection apparatus 1b includes a bias magnet 2, for producing a bias magnetic field, which is disposed opposite the circumferential periphery of the narrow-protrusion rotor 7, which in this embodiment is a narrow-protrusion rotor formed of a magnetic material. A sensor chip 3b, formed of an array of MRE bridges, is mounted in a face of the bias magnet 2 that is opposite the circumferential periphery of the narrow-protrusion rotor 7.

Figure 8:
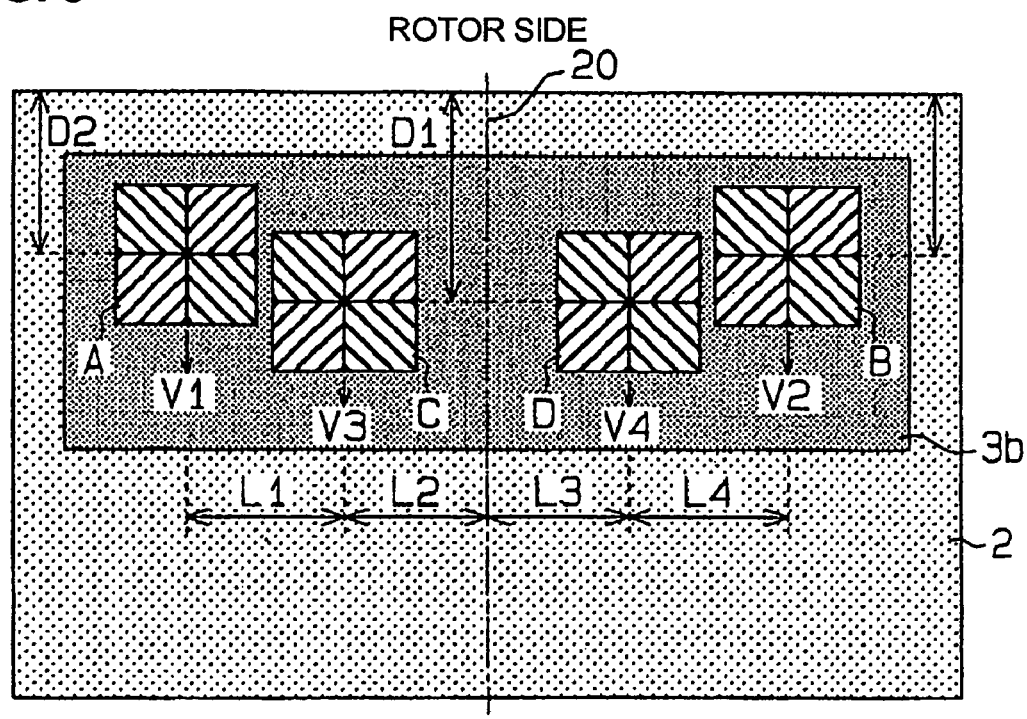
FIG. 8 is a plan view conceptually illustrating the configuration of a sensor chip of the second embodiment.

FIG. 8 is a plan view illustrating the general configuration of the sensor chip 3b of this embodiment. As shown, the outer pair of MRE bridges A and B are disposed closer to the rotor-side face of the bias magnet 2 than the inner pair of MRE bridges C and D. Specifically, the distance D2 between the respective centers of the MRE bridges A and B and the rotor-side face of the bias magnet 2 is made shorter than the distance D1 between the respective centers of the MRE bridges C and D and that rotor-side face (D2<D1).

With this configuration, the differential output (2×(V3−V4)) derived from the difference between the respective center-value potentials of the inner pair of MRE bridges C and D constitutes the main component of the differential output Vd, while the differential output (V1−V2) derived from the difference between the respective center-value potentials of the outer pair of MRE bridges A and B constitutes the compensation component of the differential output Vd. That is, the single differential output Vd is obtained as:

$$Vd=2\times(V3-V4)-(V1-V2).$$

Rotation information for the narrow-protrusion rotor 7 is detected based on this differential output Vd.

By disposing the MRE bridges A to D in that way, the compensation component is increased, thereby increasing the accuracy of edge detection of the narrow protrusions of the rotor 7, so that the accuracy of detecting rotation information concerning the narrow-protrusion rotor 7 is increased. That is to say, as described hereinabove referring to FIG. 5, the smaller the distance between the MRE bridges A and B and the rotor-side face of the bias magnet 2, the higher becomes the angular accuracy.

Figure 9:
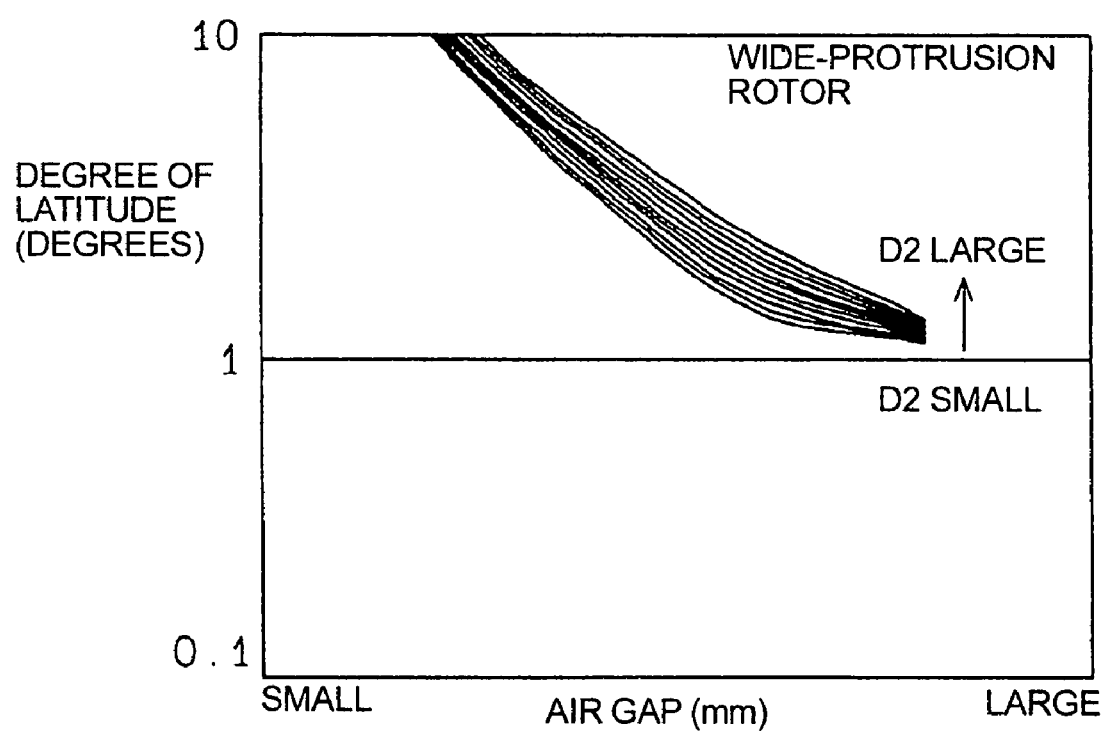
FIG. 9 shows graphs illustrating relationships between positions of MRE bridges and a degree of latitude, for the second embodiment.

FIG. 9 shows results of electromagnetic simulation of changes in the degree of latitude for the case of the narrow-protrusion rotor 7 being the detection object, when the positions of the MRE bridges C and D are held fixed at predetermined locations and the positions of the MRE bridges A and B are altered. As shown in FIG. 9, as the distance of each of the MRE bridges A and B from the rotor-side face of the bias magnet 2 is made smaller, the degree of latitude increases accordingly.

In that way, when the narrow-protrusion rotor 7 is the detection object, both the angular accuracy and degree of latitude can be optimized by setting the positions of the MRE bridges A and B as close as possible to the rotor-side face of the bias magnet 2.

The limitation on positioning the MRE bridges A and B is the point at which the saturation magnetic flux begins to fall below the level that is necessary for stable operation of the MREs. Furthermore, the magnetic field intensity of the bias magnetic field will decrease as the MRE bridges A, B are moved from the center of the central magnetic axis of the bias magnet 2, along the direction of that central magnetic axis towards the rotor-side face of the bias magnet 2. Thus, the bias magnetic field strength may become weaker than a level that is necessary for satisfactory operation, if the MRE bridges are located too close to that rotor-side face. For that reason, the respective positions at which the MRE bridges A and B are located should be such as to ensure that the requisite level of saturation magnetic flux (approximately −20 mT) is maintained.

With this embodiment, the sensor chip 3b is configured with the MRE bridges A and B located in isomagnetic regions having the saturation magnetic flux.

However it should be noted that so long as a satisfactory value of saturation magnetic flux can be maintained, it is not essential that each of the MRE bridges A to D be located in isomagnetic regions.

Figure 10A:
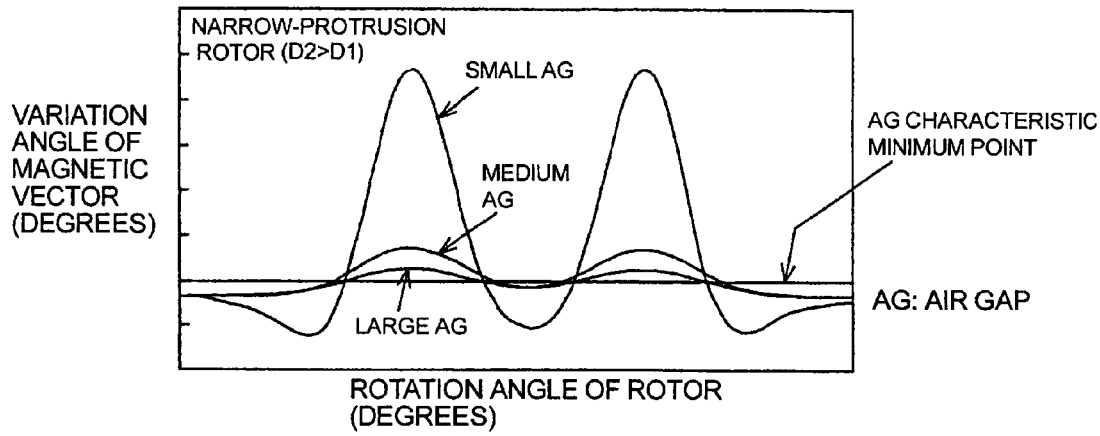
FIGS. 10A to 10C show graphs illustrating the relationship between positions of MRE bridges and waveforms corresponding to those of a differential output Vd, for the case of a narrow-protrusion rotor being the detection object of the rotation detection apparatus.
Figure 10B:
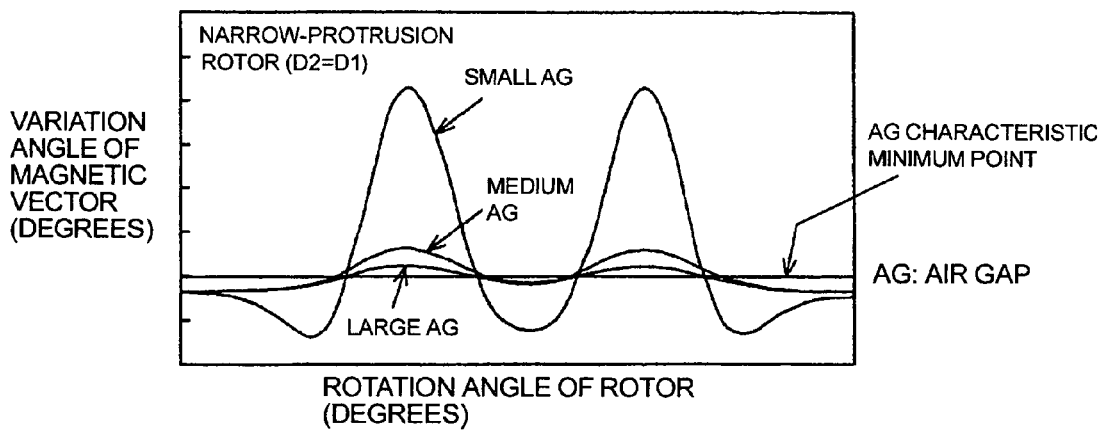
Figure 10C:
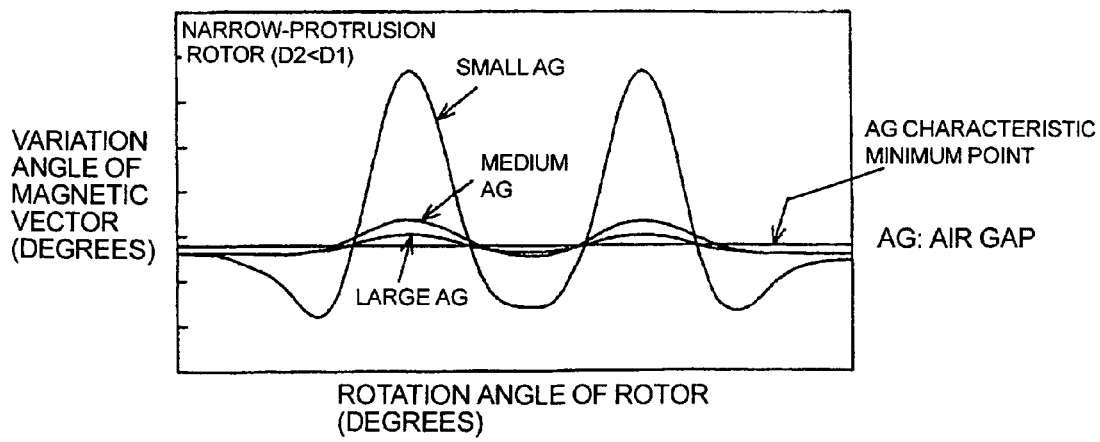

FIGS. 10A to 10C show the relationship between the positions at which the MRE bridges A and B are set (i.e., the distance D2 of each of these MRE bridges from the rotor-side face of the bias magnet 2) and the differential output Vd (shown expressed in the form of values of magnetic vector variation angle), for the case of the narrow-protrusion rotor 7 being the detection object of the rotation detection apparatus. FIG. 10A shows waveforms of the differential output Vd for respectively different sizes of the air gap (large, medium, small) for the case in which the MRE bridges A and B are located farther from the rotor-side face of the bias magnet 2 than the MRE bridges C and D (i.e., D2>D1). FIG. 10B shows waveforms of the differential output Vd for respectively different sizes of the air gap (large, medium, small) for the case in which all of the MRE bridges A to D are arrayed in a row (i.e., D2=D1). FIG. 10C shows waveforms of the differential output Vd for respectively different sizes of the air gap (large, medium, small) for the case in which the MRE bridges A and B are located closer to the rotor-side face of the bias magnet 2 than the MRE bridges C and D (i.e., D2<D1).

In the case of FIGS. 10A to 10C, the air gap characteristic minimum point corresponds to the magnetic vector variation angle at which intersections occur between the waveform of the differential output Vd when the air gap size is large and the waveform of Vd when the air gap size is small.

Figure 11A:
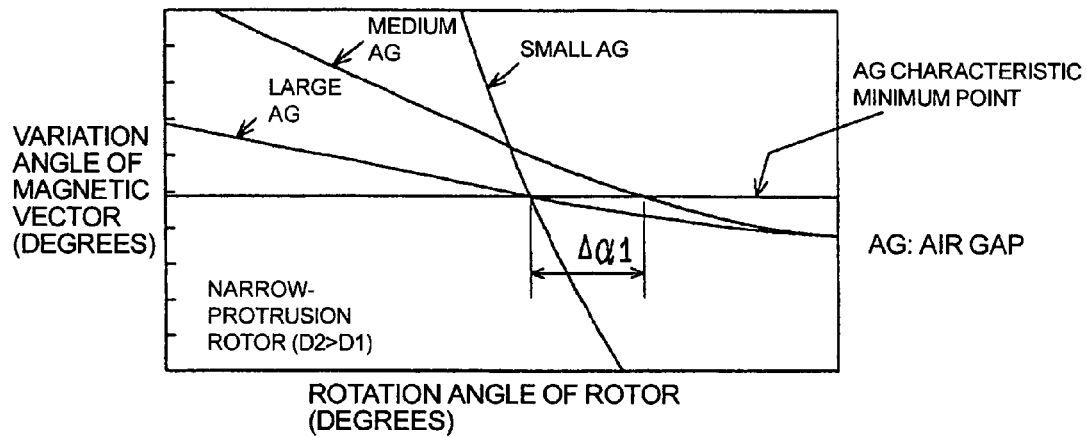
FIGS. 11A to 11C show expanded views of portions of FIGS. 10A to 10C respectively, for use in describing a concept of angular accuracy, as used in describing the present invention.
Figure 11B:
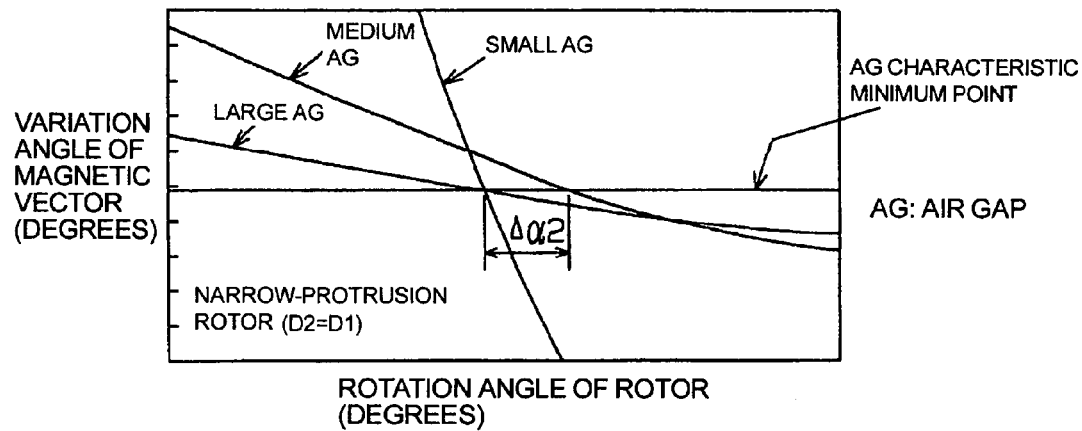
Figure 11C:
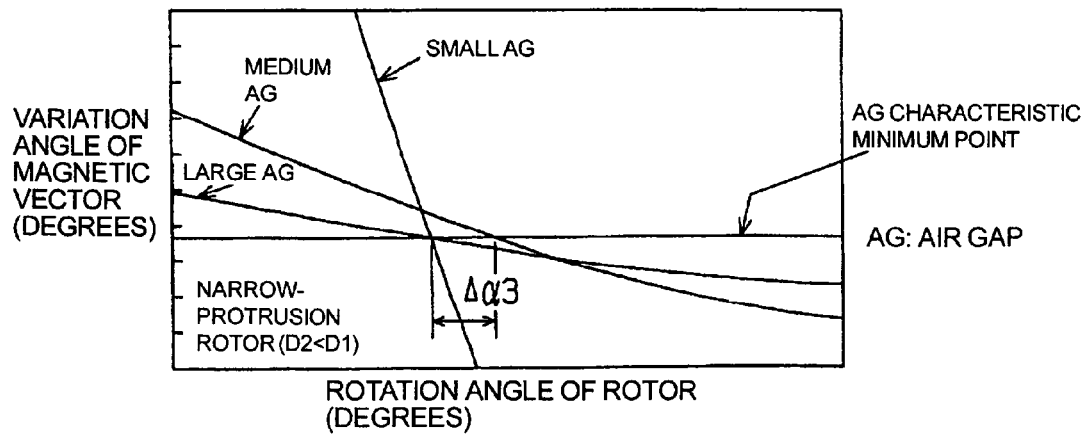

FIGS. 11A to 11C each show an expanded view of the vicinity of a point of intersection between the respective waveforms of the differential output Vd corresponding to the different sizes of air gap as described for FIGS. 10A to 10C. As shown in FIG. 11A, in the case in which the MRE bridges A and B are located farther from the rotor-side face of the bias magnet 2 than the MRE bridges C and D (i.e., D2>D1), the angular accuracy of rotation detection is the amount designated as $\Delta\alpha 1$. As shown in FIG. 11B, in the case in which the MRE bridges A to D are arrayed in a row (i.e., D2=D1), the angular accuracy of rotation detection is $\Delta\alpha 2$. As shown in FIG. 11A, in the case in which the MRE bridges A and B are located closer to the rotor-side face of the bias magnet 2 than the MRE bridges C and D (i.e., D2<D1), the angular accuracy of rotation detection is the amount designated as $\Delta\alpha 3$.

As can be understood from FIGS. 11A to 11C, the respective values of angular accuracy have the magnitude relationship [Δα1>Δα2>Δα3]. Hence, the closer the MRE bridges A and B are positioned to the rotor-side face of the bias magnet 2, the higher will become the angular accuracy, and hence the higher will become the accuracy of rotation detection.

It can thus be understood that when the narrow-protrusion rotor 7 is the detection object, e.g., used for detection of the rotation speed (rotation angle) of the crankshaft of an internal combustion engine, a high degree of angular accuracy of rotation detection can readily be achieved by positioning the MRE bridges A and B close to the rotor-side face of the bias magnet 2.

As can be understood from the above description, with the configuration shown in FIG. 8 for this embodiment whereby the outer MRE bridges A and B are located closer to the rotor-side face of the bias magnet 2 than the inner pair of MRE bridges C and D, the result is obtained that an increase level of angular accuracy of rotation detection is achieved, when the narrow-protrusion rotor 7 is the detection object.

The above embodiment has been described for the case in which the detection object is a narrow-protrusion rotor that is coupled to rotate with the crankshaft of an internal combustion engine. However in some cases an equal-pitch rotor may be utilized in such an application. As described above, an equal-pitch rotor is configured with the circumferential periphery thereof formed with recessed portions that are longer (i.e., have a greater angular extent) than in the case of a narrow-protrusion rotor. As a result, the angular accuracy and the degree of latitude that are obtained when an equal-pitch rotor is the detection object exhibit different tendencies from those for the case in which a narrow-protrusion rotor is the detection object.

Figure 12:
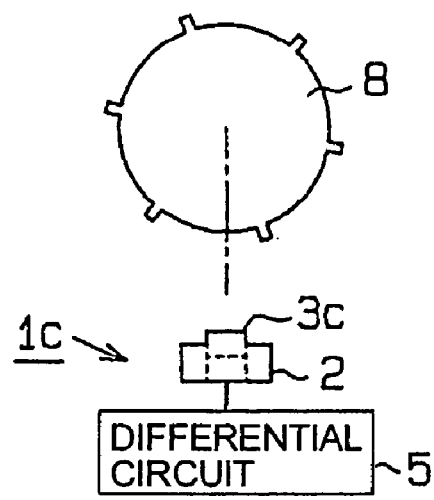
FIG. 12 is a diagram showing the general configuration of the second embodiment when an equal-pitch rotor is the detection object of the apparatus.

FIG. 12 shows the general configuration of a rotation detection apparatus 1c that is utilized with an equal-pitch rotor 8 as the detection object, and also shows the equal-pitch rotor 8. The rotation detection apparatus 1c can be configured similarly to the sensor chip 3b described above, so that detailed description is omitted. That is to say, the MRE bridges A and B are located closer to the rotor-side face of the bias magnet 2 than the inner pair of MRE bridges C and D.

Figure 13:
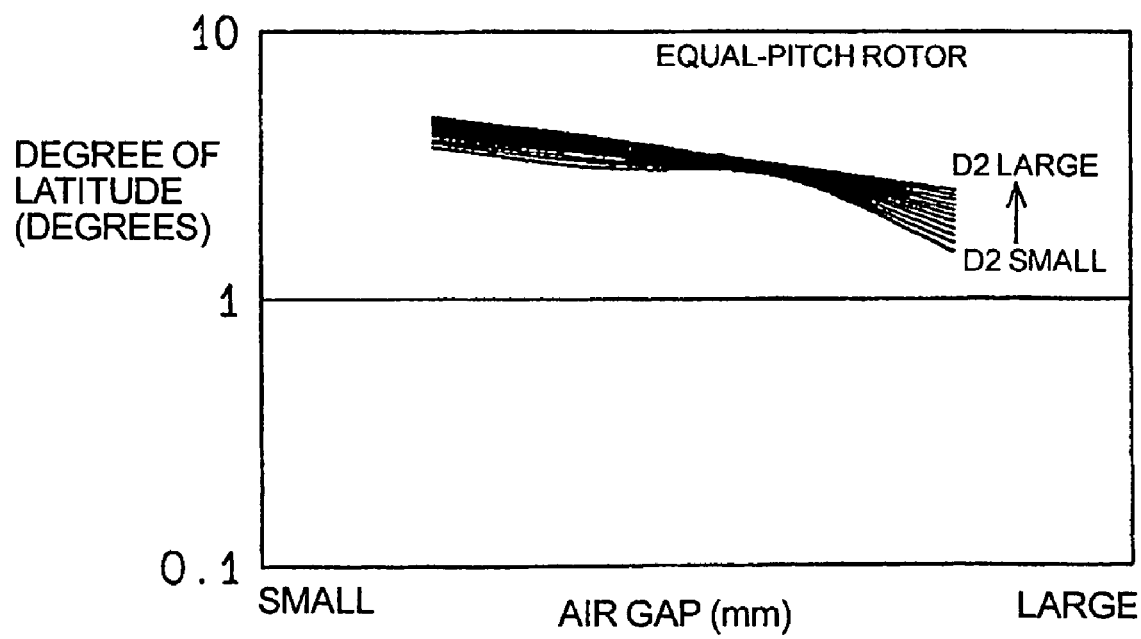
FIG. 13 shows graphs illustrating relationships between positions of MRE bridges and a degree of latitude, for the case of the second embodiment being applied to an equal-pitch rotor as the detection object of the apparatus.

FIG. 13 shows results of electromagnetic simulation of changes in the degree of latitude for the case of the equal-pitch rotor 8 being the detection object, when the positions of the MRE bridges C and D are held fixed and the positions of the MRE bridges A and B are altered. As shown in FIG. 13, as the distance of each of the MRE bridges A and B from the rotor-side face of the bias magnet 2 is increased, the degree of latitude increases accordingly. In that respect, the results obtained for the equal-pitch rotor differ from those obtained for the narrow-protrusion rotor. However as is clear from FIG. 13, even if the distance D2 of the MRE bridges A and B from the rotor-side face of the bias magnet 2 is relatively small, a substantially high degree of latitude is still obtained, i.e., which is close to the standard value of 1 for the degree of latitude.

It can thus be understood that if the sensor chip 3c has the configuration shown in FIG. 8, then both the angular accuracy and degree of latitude can meet respective requisite standards, when an equal-pitch rotor is the detection object of the rotation detection apparatus.

Third Embodiment

A third embodiment of a rotation detection apparatus will be described referring to FIGS. 14 to 18. In the same way as described for the first embodiment above, this embodiment is optimized for use in rotation detection of a wide-protrusion rotor that is coupled for rotation with the camshaft of an internal combustion engine, with the rotation detection apparatus being used to discriminate the respective cylinders of the engine. However with this embodiment, a sensor chip 3d having the configuration illustrated in FIG. 14 is utilized, in place of the sensor chip 3a of the first embodiment, and the differential circuit 5a shown in FIG. 15 is used in place of the differential circuit 5 of the first embodiment.

Figure 14:
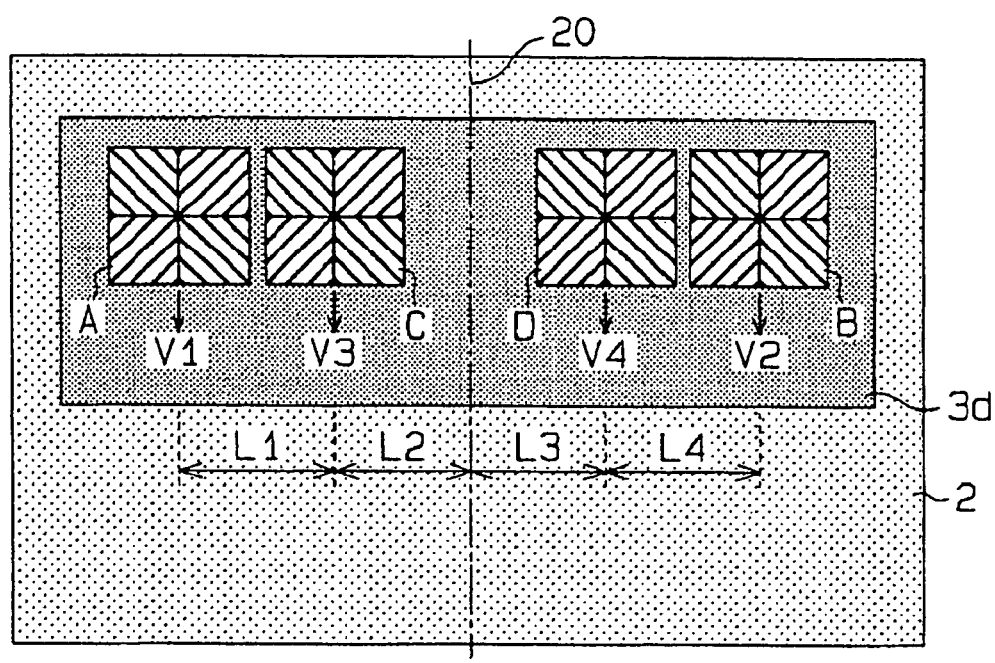
FIG. 14 is a plan view conceptually illustrating the configuration of a sensor chip of a third embodiment of a rotation detection apparatus.
Figure 15:
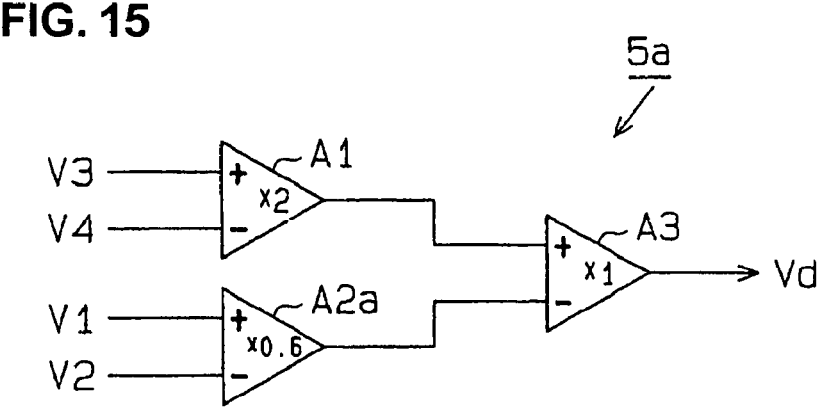
FIG. 15 is a circuit diagram of a differential amplifier circuit of the third embodiment.

As shown in FIG. 14, the sensor chip 3d of this embodiment utilizes an array of four MRE bridges A to D, with the respective median output potentials of V1, V2, V3 V4 of the MRE bridges A, B, C, D being inputted to the differential circuit 5a as shown in FIG. 15.

Basically, the differential circuit 5a is formed of a first differential amplifier A1, a second differential amplifier A2a, and a third differential amplifier A3. Of these, the differential amplifier A2a, which produces the compensation component of the differential output Vd, has an amplification factor of 0.6, and produces a differential output [0.6×(V1−V2)] from the median output potentials V1, V2 of the MRE bridges A and B. The third differential amplifier A3 therefore derives the single differential output Vd as:

[2×(V3−V4)−0.6×(V1−V2)]

By thus setting the amplification factor of the second differential amplifier A2a as 0.6, the amplitude of the compensation component is decreased, so that the waveform amplitude of the single differential output Vd is appropriately increased. Hence, the degree of latitude for rotation detection is made higher.

Figure 16:
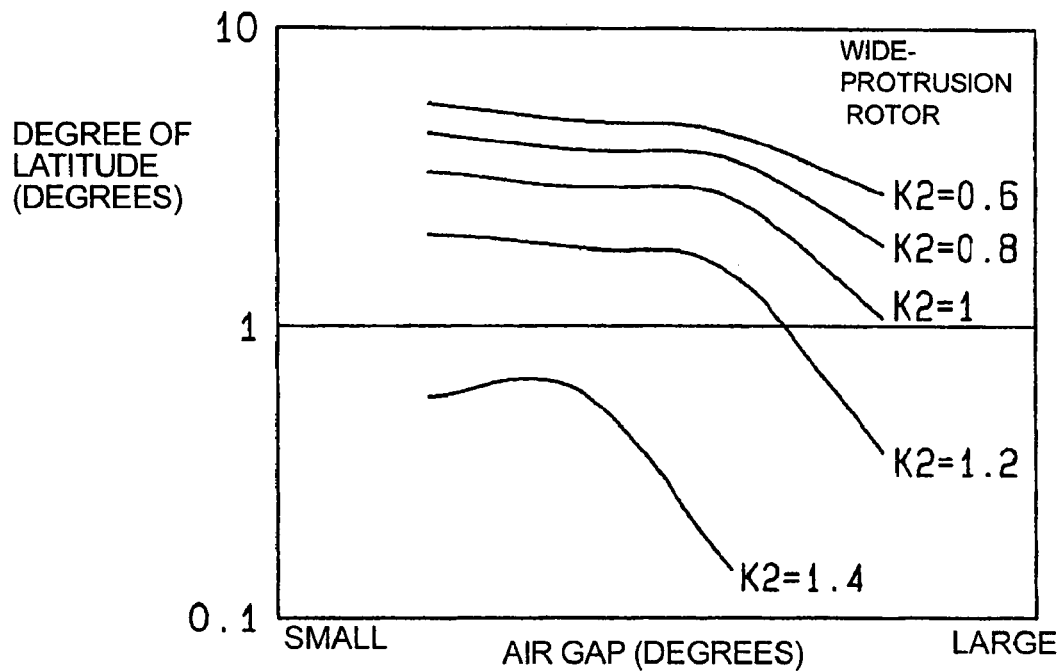
FIG. 16 shows graphs illustrating relationships between positions of MRE bridges and a degree of latitude, for the third embodiment, for the case of a wide-protrusion rotor being the detection object of the apparatus.

FIG. 16 shows results of electromagnetic simulation of the relationship between the degree of latitude and the amplification factor K2 of the second differential circuit A2a, for the case of the wide-protrusion rotor 6 being the detection object. As shown by FIG. 16, the smaller the value of the amplification factor K2 is made, the higher becomes the degree of latitude. With this embodiment, the amplification factor K2 is set as 0.6, which enables the degree of latitude to be made substantially higher than is achieved in the prior art (i.e., when the value of K2 is set as 1).

Figure 17:
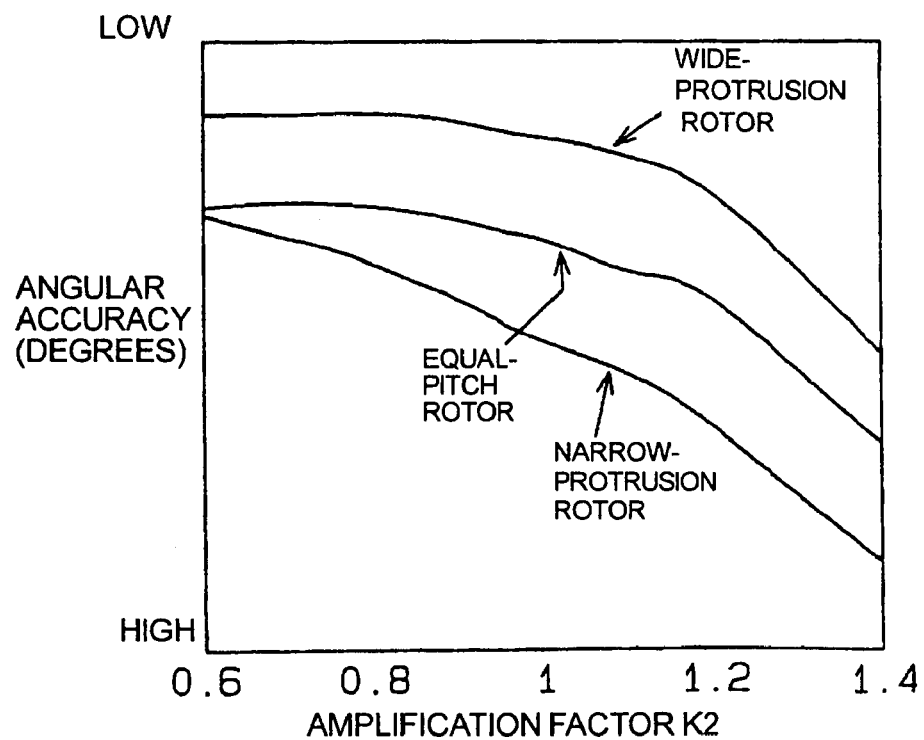
FIG. 17 shows graphs illustrating relationships between various different rotor configurations and angular accuracy, for the third embodiment.

FIG. 17 shows results of electromagnetic simulation of the relationship between the angular accuracy and the amplification factor K2 of the second differential circuit A2a, for the case of various different configurations of rotor, i.e., for the case of the wide-protrusion rotor 6 and also the narrow-protrusion rotor 7 and the equal-pitch rotor 8. As is clear from FIG. 17, for each of these different rotor configurations, the angular accuracy exhibits a tendency to become lower as the amplification factor K2 is reduced.

However as described above, when the wide-protrusion rotor 6 is utilized, coupled to the camshaft of an internal combustion engine for example, it is more important to achieve a high degree of latitude than to achieve a high level of angular accuracy. It is for that reason that the amplification factor K2 of the differential circuit A2a of this embodiment is set as 0.6, so that a sufficiently high degree of latitude can be attained, although this is results in a lowering of the angular accuracy, to some extent.

Figure 18A:
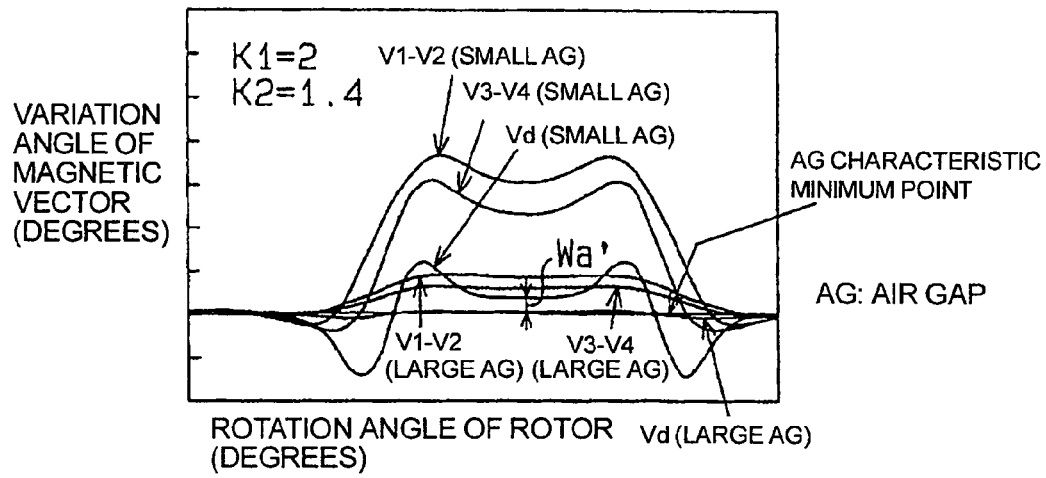
FIGS. 18A to 18C show graphs illustrating the relationship between changes in the amplification factor of a differential amplifier which derives the compensation component of the differential output Vd and waveforms corresponding to those of the differential output Vd, the compensation component, and the main component of Vd.
Figure 18B:
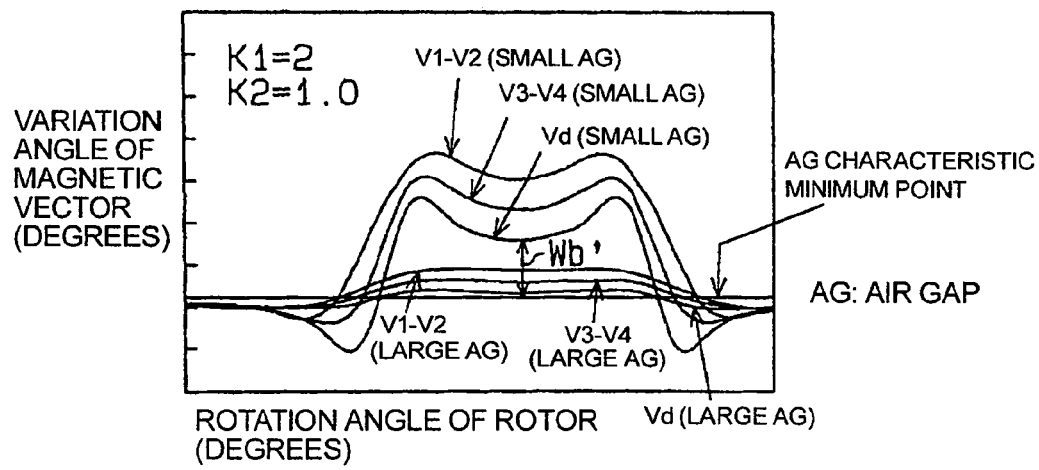
Figure 18C:
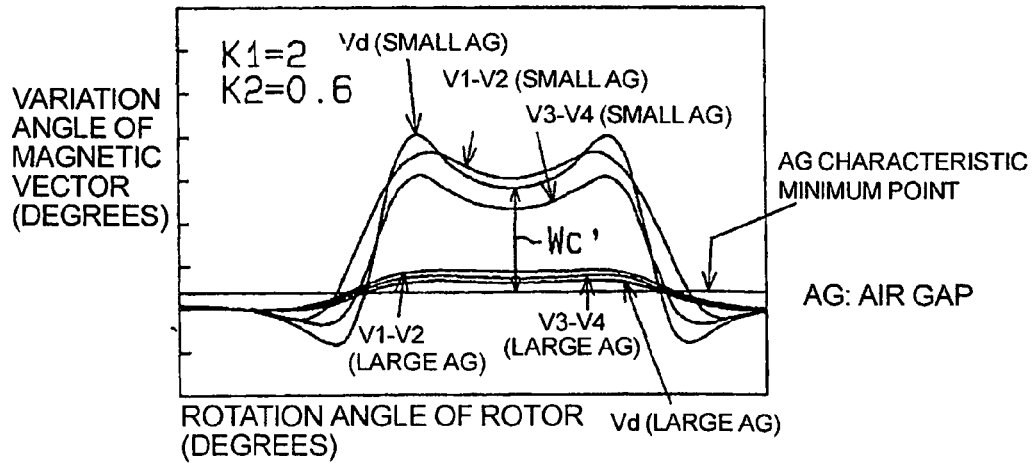

FIGS. 18A to 18C show relationships between the amplification factor K2 of the differential circuit A2a, the main component and compensation component of the differential output Vd, and the differential output Vd, for the case of the wide-protrusion rotor 6 being the detection object. FIG. 18A shows the waveforms of Vd and the main component and compensation component of Vd, for the case of the amplification factor K2 being 1.4. FIG. 18B shows the waveforms of Vd and the main component and compensation component of Vd, for the case of the amplification factor K2 being 1.0. FIG. 18C shows the waveforms of Vd and the main component and compensation component of Vd, for the case of the amplification factor K2 being 0.6.

As is clear from these FIGS. 18A to 18C, the lower the amplification factor K2 of the differential circuit A2a is made (i.e., the differential circuit that produces the compensation component of the single differential output Vd), the greater becomes the amplitude of the waveform of Vd, where Vd is [K2×(V3−V4)−K1×(V1−V2)] as described above.

In addition, as is also clear from these FIGS. 18A to 18C, as the amplification factor K2 is successively reduced from 1.4 to 1.0 to 0.6, the degree of latitude accordingly changes from Wa' to Wb' to Wc', where these have the relationship Wa'<Wb'<Wc'. Thus, the lower the value of the amplification factor K2 of the second differential amplifier A2a, the higher becomes the degree of latitude of rotation detection.

As shown above, the following effects are obtained with this embodiment:

(1) Due to the fact that the amplification factor K2 of the second differential amplifier A2a (which produces the compensation component of the differential output Vd) is set as 0.6, the amplitude of the compensation component (i.e., V1−V2) is reduced, so that the amplitude of the differential output Vd is accordingly increased. In that way, the degree of latitude for detecting rotation information can be appropriately increased, to be suitable for the case in which the wide-protrusion rotor 6 is the detection object.

(2) With this embodiment, the amplitude of the differential output Vd is adjusted electrically, by appropriately setting the amplification factor of a differential amplifier. Thus it is not necessary to alter the respective positions at which the MRE bridge A to D are set, so that it becomes possible to utilize a standardized component as the sensor chip, having a fixed array of MRE bridges. In that way, the same model of sensor chip can be applied in rotation detection for various different configurations of rotor, so that this embodiment has great generality of use.

With this embodiment, in the same way as for the first embodiment, the amplification factor K1 of the first differential amplifier A1 is set as 2. However it would be equally possible to set the value of K2 higher than 2, in order to increase the amplitude of the main component of the differential output Vd. In that case, the increased amplitude of Vd will result in a higher degree of latitude being achieved.

Furthermore this embodiment, the amplification factor K2 of the second differential amplifier A2 is set as 0.6. However it would be equally possible to set K2 at some other arbitrary value, that is less than 1.0.

Moreover although with the above embodiment, values of 2 and 0.6 respectively are set for the amplification factors K1, K2 of the first and second differential amplifiers A1 and A2a, it would be equally possible to utilize other arbitrarily determined values for K1 and K2, so long as the following relationship is satisfied:

$$(K1 \times (V3-V4) - K2 \times (V1-V2)) > (2 \times (V3-V4) - (V1-V2))$$

that is to say $$(K1 \times \text{amplitude of main component}) - (K2 \times \text{compensation component}) > (2 \times \text{amplitude of main component}) - (\text{amplitude of compensation component}).$$

Fourth Embodiment

A fourth embodiment of a rotation detection apparatus according to the present invention will be described referring to FIGS. 19 and 20. In the same way as for the second embodiment described above, this embodiment is suitable for detection of the rotation speed (rotation angle) of the crankshaft of an internal combustion engine, i.e., by detecting rotation information for a narrow-protrusion rotor 7 (shown in FIG. 7, described hereinabove) that is coupled to the crankshaft. However with this embodiment as is clear from FIG. 19, a differential circuit 5b is used in place of the differential circuit 5, and a sensor chip is used which is as described hereinabove referring to FIG. 15.

Figure 19:
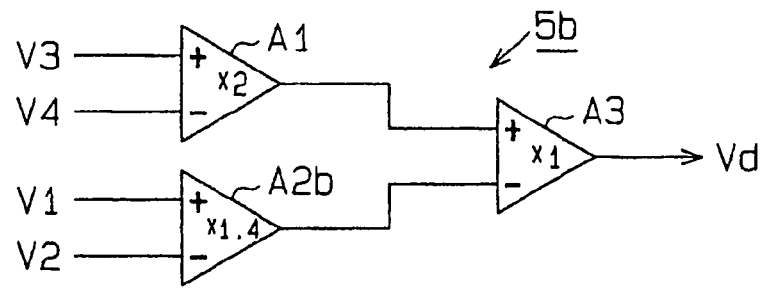
FIG. 19 is a circuit diagram of a differential circuit of a fourth embodiment of a rotation detection apparatus.

The respective median output potentials of the MRE bridges A to D are inputted to the differential circuit 5b as shown in FIG. 19. The differential circuit 5b basically consists of a first differential amplifier A1, a second differential amplifier A2b and a third differential amplifier A3. Of these, the second differential amplifier A2b which produces the compensation component has an amplification factor of 1.4, i.e., produces a differential output of 1.4×(V1−V2) from the median output potentials V1, V2 of the MRE bridges A and B. As a result, the third differential amplifier A3 obtains the single differential output Vd as:

$$[2 \times (V3-V4) - 1.4 \times (V1-V2)].$$

Rotation information for the narrow-protrusion rotor 7 is detected based upon this single differential output Vd.

In that way, by setting a value of 1.4 for the amplification factor of the second differential amplifier A2b which produces the compensation component of the differential output Vd, the amplitude of the compensation component is increased, so that increased accuracy of edge detection is achieved of the peripheral protrusions of the narrow-protrusion rotor 7, and hence enhanced angular accuracy is achieved.

Figure 20:
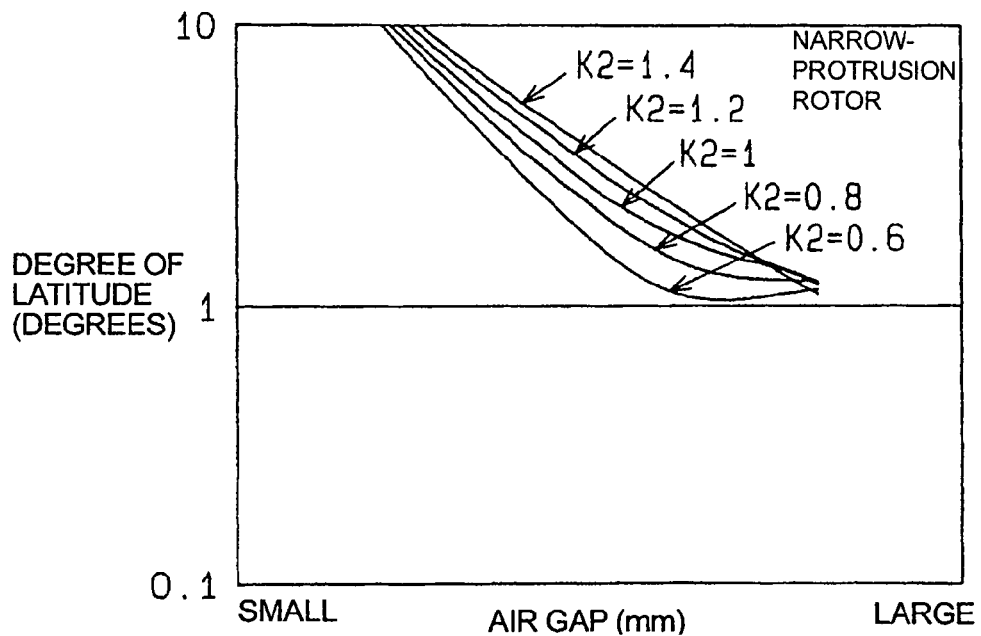
FIG. 20 shows graphs illustrating relationships between changes in the amplification factor of a differential amplifier which produces the compensation component of the differential output Vd and the degree of latitude, for the fourth embodiment, for the case of a narrow-protrusion rotor being the detection object of the apparatus.

FIG. 20 shows the results of electromagnetic simulation of the relationship between the amplification factor of the second differential amplifier A2b and the degree of latitude, for the case in which the narrow-protrusion rotor 7 is the detection object. As shown in FIG. 20, the higher the value of the amplification factor K2, the higher becomes the degree of latitude. When K2 is set as 1.4, a substantially higher degree of latitude can be achieved than for the prior art (i.e., when an amplification factor of 1 would be used for K2).

As described above referring to FIG. 17, when the narrow-protrusion rotor 7 is the detection object, the higher the value of the amplification factor K2 of the second differential amplifier, the higher becomes the angular accuracy. Hence when a rotor such as the narrow-protrusion rotor 7 is the detection object, a high degree of angular accuracy can readily be achieved by setting the amplification factor K2 of the second differential circuit A2b (which produces the compensation component of the differential output Vd) as 1.4.

As shown by the above, the following results are obtained with this embodiment:

(1) When a narrow-protrusion rotor is the detection object, a suitably high level of angular accuracy of rotation detection can be achieved by setting the amplification factor K2 of the second differential amplifier A2b as a value substantially equal to 1.4.

(2) With this embodiment, angular accuracy can be optimized by an electrical method, i.e., by appropriately setting the amplification factor of a differential amplifier. As a result, it is not necessary to alter the respective positions at which the MRE bridge A to D are set, in order to optimize the angular accuracy. This is an advantage, since there are limitations on the positions at which the MRE bridges can be located, to ensure that a sufficient value of saturation magnetic field is maintained. Furthermore the sensor chip can be formed as a standardized component, with the MRE bridges A to D fixedly arrayed in a row, for example. Hence, the same model of sensor chip 3d can be applied in rotation detection for various different configurations of rotor, so that this embodiment can have high generality of application.

This embodiment has been described for the case in which the amplification factor of the second differential amplifier A2b is set as 1.4. However the invention is not limited to the use of such a value, and it would be possible to use some other appropriate value, so long as the following relationship is maintained between the differential amplifier factors K1 and K2:

$$K1/K2 < 2.$$

Furthermore this embodiment has been described for the case in which the narrow-protrusion rotor 7 is the detection object. However it would be equally possible to apply the embodiment to rotation detection of a rotor such as the equal-pitch rotor 8 described above.

Other Embodiments

Figure 21:
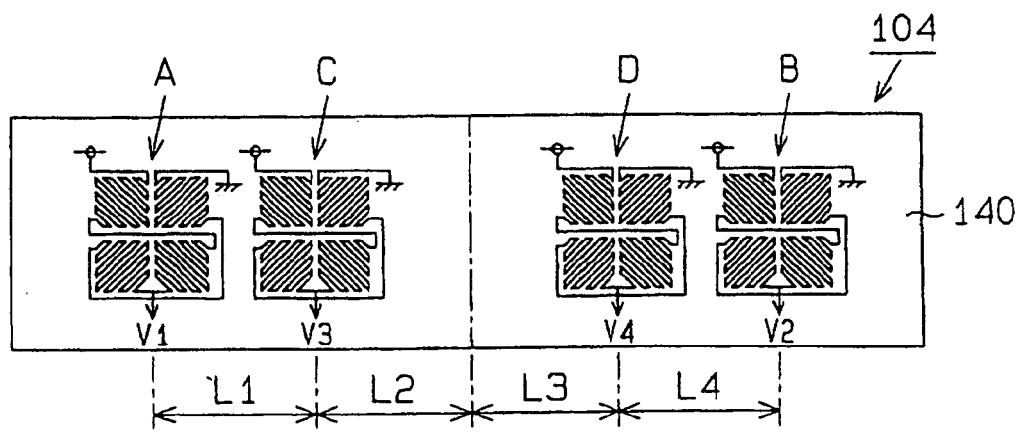
FIG. 21 is a plan view conceptually illustrating the configuration of a sensor chip of prior art example of a rotation detection apparatus.
Figure 22:
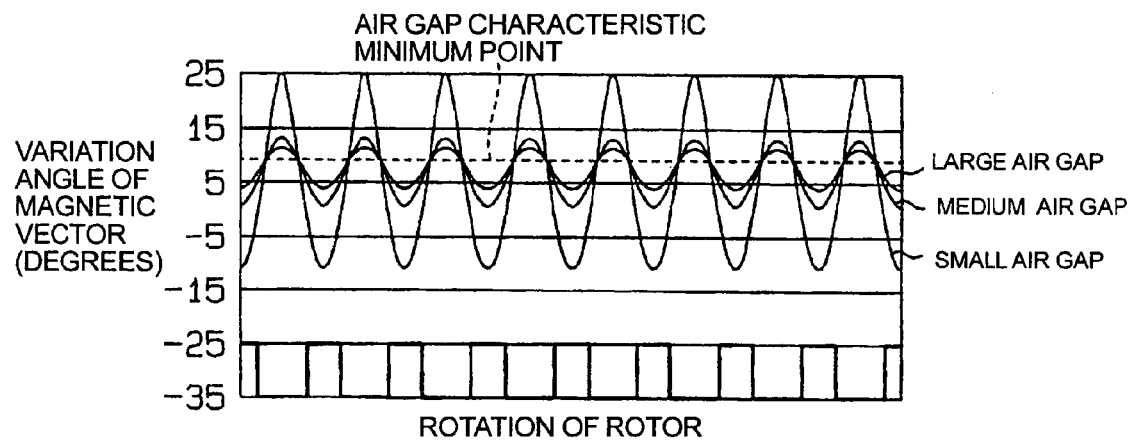
FIG. 22 shows waveforms of an output detection signal produced by the prior art rotation detection apparatus, for the case of a narrow-protrusion rotor being the detection object of the apparatus.
Figure 23:
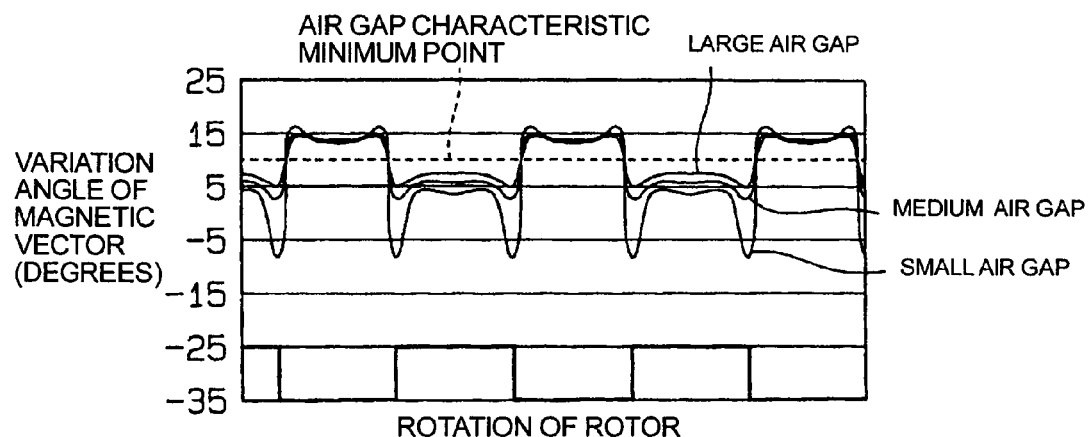
FIG. 23 shows waveforms corresponding to an output detection signal produced by the prior art rotation detection apparatus, for the case of a wide-protrusion rotor being the detection object of the apparatus.
Figure 24:
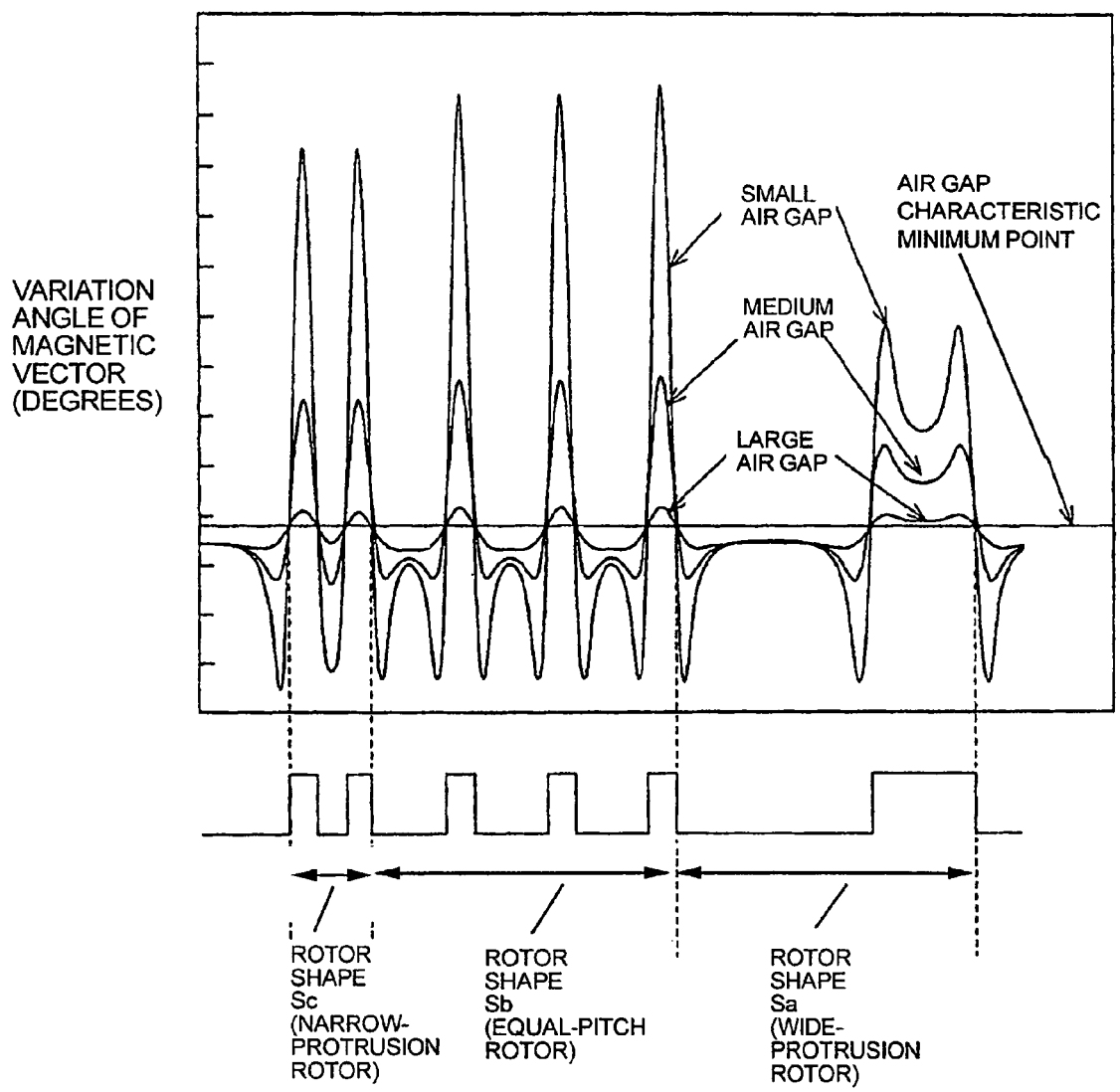
FIG. 24 shows waveforms corresponding to an output differential signal produced by the prior art rotation detection apparatus, for respectively different configurations of rotor.
Figure 25:
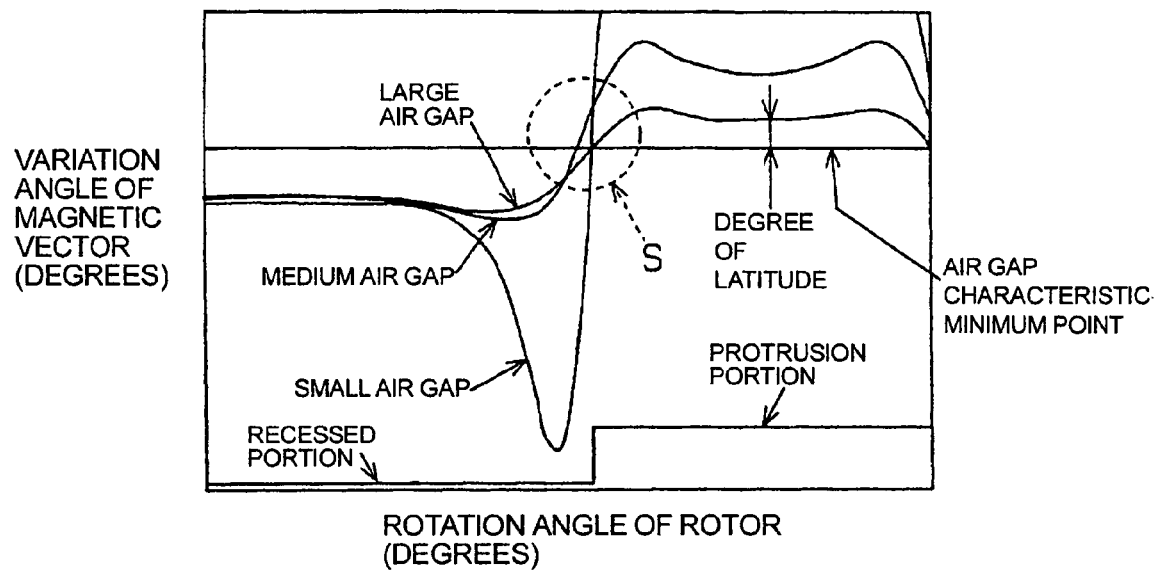
FIG. 25 shows waveforms of an output differential signal, for use in defining the concept of an air gap characteristic minimum point, as used in describing the present invention.
Figure 26:
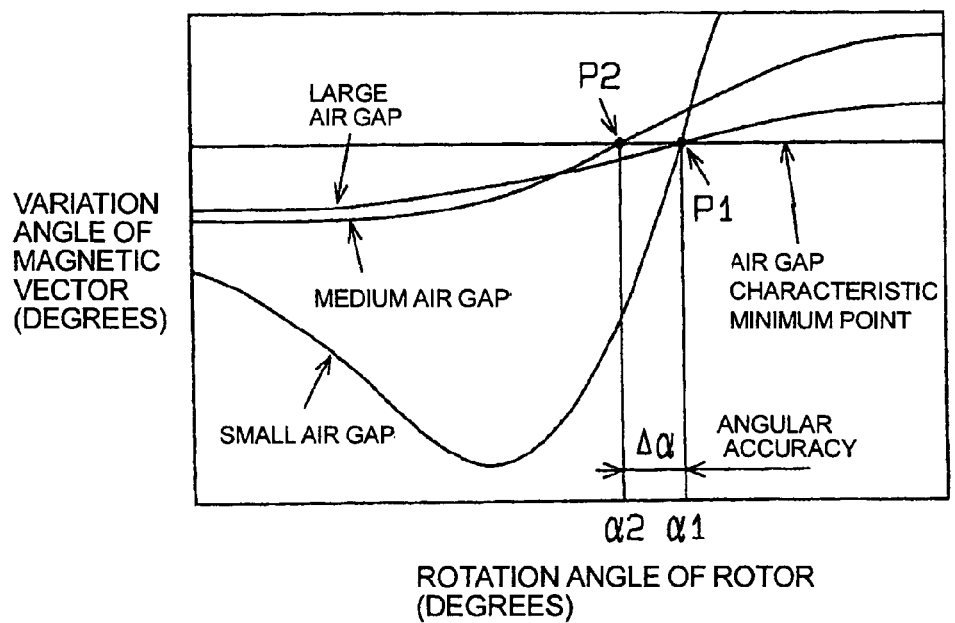
FIG. 26 shows waveforms of an output differential signal, for use in defining the concept of angular accuracy, as used in describing the present invention

In addition to the above, other embodiments of the invention could be envisaged, e.g., as follows:

(a) With the embodiments described above, the distances L1 to L4 (e.g., as shown in FIG. 21) are made approximately equal. However this is not essential, and it would be possible for example to increase the distances L3 and L4 appropriately.

(b) With the embodiments described above, the bias magnet 2 is formed with a cavity, to accommodate the sensor chip. However it would be equally possible to use various other configurations for the bias magnet 2, for example to have a U-shape configuration as seen in cross-section.

(c) With the embodiments described above, the sensor chip of each embodiment (3a, 3b, 3c, 3c) is formed by molding of a synthetic resin. However it would be equally possible to mount the sensor chip directly upon the bias magnet 2, without utilizing molding processing, (d) With the embodiments described above, four MRE bridges A to D are utilized, which are located symmetrically with respect to the central magnetic axis of the bias magnet 2. However it would be equally possible to use more then four MRE bridges, e.g., with an additional MRE bridge being located on the central magnetic axis of the bias magnet 2.

(e) With the embodiments described above, the amplification factor K3 of the third differential amplifier A3 is set as 1. However it would be equally possible to set a value for K3 that is higher than 1. If that is done, then the amplitude of the differential output Vd can be increased (irrespective of the rotor configuration) so that the degree of latitude can be increased.

(f) With the embodiments described above, increasing the degree of latitude or the angular accuracy is achieved by adjusting the positions of the MRE bridges A and B (for example, with the first and second embodiments), or by adjusting the amplification factor K2 of the second differential amplifier (for example, with the first and second embodiments). However it would be equally possible to obtain a similar result by adjusting the positions of the MRE bridges A and B and also adjusting the amplification factors K1, K2, K3 of the differential amplifiers A1, A2, A3 appropriately. For example, if the positions of the MRE bridges A and B on the sensor chip should deviate from predetermined positions (i.e. due to manufacturing deviations) a required waveform shape for the single differential output signal Vd can be achieved by suitably adjusting the amplifier factor(s) of one or more of the differential amplifiers A1 to A3. In that way it becomes possible to reduce the number of sensor chips that are rejected in the process of manufacture, i.e., the manufacturing yield of the sensor chips can be substantially increased.

What is claimed is:

1. A rotation detection apparatus for detecting a rotation condition of a rotor that is formed of a magnetic material and has a circumferential periphery with a configuration of successively alternating protruding portions and recessed portions, the apparatus including a sensor chip having a plurality of magnetoresistive elements and a bias magnet for applying a bias magnetic field to said magnetoresistive elements, said detection being performed by sensing changes in resistance values of said magnetoresistive elements due to changes in a magnetic vector of said bias magnetic field as said circumferential periphery of said rotor rotates close to said sensor chip;

wherein said magnetoresistive elements of said sensor chip are configured as an array of at least four magnetoresistive element bridges arranged in an orientation determined by a rotation direction of said rotor, and a first distance and a second distance are different from each other and respectively separately set with respect to an end face of said bias magnet, said end face being located directly opposite said circumferential periphery of said rotor, said first distance being a distance between said end face of said bias magnet and each of respective centers of at least two magnetoresistive element bridges which are located at outer positions within said array of magnetoresistive element bridges, and said second distance being a distance between said end face of said bias magnet and each of respective centers of at least two magnetoresistive element bridges which are located at inner positions within said array of magnetoresistive element bridges.

2. A rotation detection apparatus as claimed in claim 1, comprising differential circuit means for generating a main component signal based on a difference between respective median output potentials of said at least two magnetoresistive element bridges which are located at inner positions, a compensation component signal based on a difference between respective median output potentials of said at least two magnetoresistive element bridges which are located at outer positions, and a single differential output signal based on a difference between said main component signal and said compensation component signal, with said single differential output signal expressing information concerning said rotation condition of said rotor;

wherein said first distance and second distance are respectively separately set such that a waveform of said single differential output signal attains a condition predetermined in accordance with said configuration of said periphery of said rotor.

3. A rotation detection apparatus as claimed in claim 2, wherein
said single differential output signal is converted to binary signal form by utilizing a specific threshold value for said conversion, to obtain a binary output signal expressing said information concerning said rotation condition of said rotor,
said condition that is predetermined for said waveform of said single differential output signal is that a degree of latitude attain a predetermined standard, said degree of latitude being a difference between a value of amplitude of said single differential output signal and said specific threshold value, and
said first distance and second distance are respectively set such as to have the relationship:

first distance<second distance.

4. A rotation detection apparatus as claimed in claim 2, wherein
said single differential output signal is converted to binary signal form by utilizing a specific threshold value for said conversion, to obtain a binary output signal expressing said information concerning said rotation condition of said rotor,
said condition that is predetermined for said waveform of said single differential output signal is that an angular accuracy attain a predetermined standard, said angular accuracy being an amount of deviation between respective rotation angles of said rotor at which said amplitude of said single differential output signal coincides with said specific threshold value, when an air gap between said end face of said bias magnet and said circumferential periphery of said rotor attains a plurality of different sizes, and
said first distance and second distance are respectively set such as to have the relationship:

first distance>second distance.

5. A rotation detection apparatus as claimed in claim 2, wherein
said single differential output signal is converted to binary signal form by utilizing a specific threshold value for said conversion, to obtain a binary output signal expressing said information concerning said rotation condition of said rotor,
said condition that is predetermined for said s waveform of said single differential output signal is that a degree of latitude and an angular accuracy attain respective predetermined standards, said degree of latitude being a difference between a value of amplitude of said single differential output signal and said specific threshold value and said angular accuracy being a difference between respective rotation angles of said rotor at which said amplitude of said single differential output signal coincides with said specific threshold value, when an air gap between said end face of said bias magnet and said circumferential periphery of-said rotor attains a plurality of respectively different sizes, and
said first distance and second distance are respectively set such as to have the relationship:

first distance>second distance.

6. A rotation detection apparatus for detecting changes in rotation angle of a rotor that is formed of a magnetic material and has a circumferential periphery having a configuration of successively alternating protruding portions and recessed portions, said rotation detection apparatus including a sensor chip having a plurality of magnetoresistive elements and a bias magnet for applying a bias magnetic field to said magnetoresistive elements, with a central magnetic axis of said bias magnetic field oriented substantially towards a rotation axis of said rotor, said detection being performed by sensing changes in resistance values of said magnetoresistive elements due to changes in a magnetic vector of said bias magnetic field as said circumferential periphery of said rotor rotates close to said sensor chip, and amplifier means for deriving an output detection signal indicative of said changes in rotation angle, based on said changes in resistance values of said magnetoresistive element, with said output detection signal having a waveform that is at least partially determined by said configuration of said rotor periphery;
wherein
said magnetoresistive elements of said sensor chip are configured as an array of four magnetoresistive element bridges having an orientation determined by a rotation axis of said rotor, with a first pair of said magnetoresistive element bridges both located at a first distance from an end face of said bias magnet that is located directly opposite said circumferential periphery of said rotor and disposed symmetrically with respect to said central magnetic axis, and a second pair of said magnetoresistive element bridges both located at a second distance from said end face of said bias magnet and disposed symmetrically with respect to said central magnetic axis, located outward from said first pair of magnetoresistive element bridges with respect to said central magnetic axis, and
said first distance and a second distance are different from each other and respectively separately set, for achieving a desired form of said output detection signal waveform.

7. A rotation detection apparatus for detecting changes in rotation angle of a rotor that is formed of a magnetic material and has a circumferential periphery with a configuration of successively alternating protruding portions and recessed portions, said rotation detection apparatus including a sensor chip having a plurality of magnetoresistive elements and a bias magnet for applying a bias magnetic field to said magnetoresistive elements, with a central magnetic axis of said bias magnetic field oriented substantially towards a rotation axis of said rotor, said detection being performed by sensing changes in resistance values of said magnetoresistive elements due to changes in a magnetic vector of said bias magnetic field as said circumferential periphery of said rotor rotates close to said sensor chip, and amplifier means for deriving an output detection signal indicative of said changes in rotation angle, based on said changes in resistance values of said magnetoresistive element, with a waveform of said output detection signal being at least partially determined by said configuration of said rotor periphery;
wherein
said magnetoresistive elements of said sensor chip are configured as an array of four magnetoresistive element bridges having an orientation determined by a rotation axis of said rotor, with a first pair of said magnetoresistive element bridges both located at a first distance from an end face of said bias magnet that is located directly opposite said circumferential periphery of said rotor and disposed symmetrically with respect to said central magnetic axis, and a second pair of said magnetoresistive element bridges both located at a second distance from said end face of said bias magnet and disposed symmetrically with respect to said central magnetic axis, and located outward from said first pair of magnetoresistive element bridges with respect to said central magnetic axis, said amplifier means comprises a first differential circuit for generating a main component signal expressing a difference between respective median output potentials of said first pair of magnetoresistive element bridges, a second differential circuit for generating a compensation component signal expressing a difference between respective median output potentials of said second pair of magnetoresistive element bridges, and a third differential circuit for deriving a single differential output signal based on a difference between said main component signal and said compensation component signal, with said single differential output signal constituting said output detection signal, and said first distance and a second distance are different from each other and respectively separately set, for achieving a desired waveform for said single differential output signal.

8. A method of designing a rotation detection apparatus for detecting a rotation condition of a rotor that is formed of a magnetic material and has a circumferential periphery with a configuration of successively alternating protruding portions and recessed portions, the apparatus including a sensor chip having a plurality of magnetoresistive elements and a bias magnet for applying a bias magnetic field to said magnetoresistive elements, said detection being performed by sensing changes in resistance values of said magnetoresistive elements due to changes in a magnetic vector of said bias magnetic field as said circumferential periphery of said rotor rotates close to said sensor chip, the method comprising:

configuring said magnetoresistive elements of said sensor chip as an array of at least four magnetoresistive element bridges arranged in an orientation determined by a rotation axis of said rotor, and setting a first distance and a second distance respectively separately such as to satisfy at least one condition that is determined by said configuration of aid circumferential periphery of said rotor said first distance being different from said second distance, said first distance being a distance between an end face of said bias magnet that is located directly opposite said circumferential periphery of said rotor and each of respective centers of at least two magnetoresistive element bridges which are located at outer positions within said array of magnetoresistive element bridges, and said second distance being a distance between said end face of said bias magnet and each of respective centers of at least two magnetoresistive element bridges which are located at inner positions within said array of magnetoresistive element bridges.

* * * * *